(12) United States Patent
Ko

(10) Patent No.: US 12,510,624 B2
(45) Date of Patent: Dec. 30, 2025

(54) METHOD AND DEVICE FOR SYNCHRONIZATION FOR SL POSITIONING

(71) Applicant: LG ELECTRONICS INC., Seoul (KR)

(72) Inventor: Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 328 days.

(21) Appl. No.: 18/298,788

(22) Filed: Apr. 11, 2023

(65) Prior Publication Data

US 2023/0417863 A1  Dec. 28, 2023

Related U.S. Application Data

(60) Provisional application No. 63/333,615, filed on Apr. 22, 2022.

(51) Int. Cl.
*G01S 5/02* (2010.01)
*G01S 5/10* (2006.01)
*H04W 92/18* (2009.01)

(52) U.S. Cl.
CPC .............. *G01S 5/0289* (2013.01); *G01S 5/10* (2013.01); *H04W 92/18* (2013.01)

(58) Field of Classification Search
CPC .................................. G01S 5/0289; G01S 5/10
USPC ............................................................ 342/463
See application file for complete search history.

(56) References Cited

U.S. PATENT DOCUMENTS

2022/0078581 A1\* 3/2022 Choi ...................... G01S 5/0269

FOREIGN PATENT DOCUMENTS

WO    WO-2022034483 A2 \* 2/2022 ........... G01S 13/765

\* cited by examiner

*Primary Examiner* — Harry K Liu
(74) *Attorney, Agent, or Firm* — LEE, HONG, DEGERMAN, KANG & WAIMEY

(57) ABSTRACT

A method of operating a first device 100 in a wireless communication system is proposed. The method may comprise: obtaining information related to an SL PRS resource; receiving a first PRS at a first time point, based on the SL PRS resource; receiving a second PRS at a second time point, based on the SL PRS resource; receiving, a first distance value between the second device 200 and the third device 300; obtaining a first RSTD value between the second device 200 and the third device 300; and performing the positioning based on the first RSTD value.

14 Claims, 23 Drawing Sheets and DEVICE FOR
SYNCHRONIZATION FOR SL POSITIONING

CROSS REFERENCE TO RELATED APPLICATION(S)

Pursuant to 35 U.S.C. § 119(e), this application claims the benefit of U.S. Provisional Patent Application No. 63/333,615, filed on Apr. 22, 2022, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an entity having an infrastructure (or infra) established therein, and so on. The V2X may be spread into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment, a method for performing, by a first device, wireless communication may be proposed. For example, the method may comprise: obtaining information related to a sidelink (SL) positioning reference signal (PRS) resource, for positioning of the first device; receiving a first PRS at a first time point, from a second device included in an SL positioning group for the positioning, based on the SL PRS resource; receiving a second PRS at a second time point, from a third device included in the SL positioning group, based on the SL PRS resource; receiving, from the second device, a first distance value between the second device and the third device; obtaining a first reference signal time difference (RSTD) value between the second device and the third device, based on the first time point, the second time point, and the first distance value; and performing the positioning based on the first RSTD value, wherein the first PRS may be transmitted by the second device at a third time point, wherein the second PRS may be transmitted by the third device at a fourth time point, which is after a time point at which the first PRS is received by the third device by a first time interval, and wherein the first distance value may be obtained based on the third time point, a fifth time point at which the second PRS is received by the second device, and the first time interval.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain information related to a sidelink (SL) positioning reference signal (PRS) resource, for positioning of the first device; receive a first PRS at a first time point, from a second device included in an SL positioning group for the positioning, based on the SL PRS resource; receive a second PRS at a second time point, from a third device included in the SL positioning group, based on the SL PRS resource; receive, from the second device, a first distance value between the second device and the third device; obtain a first reference signal time difference (RSTD) value between the second device and the third device, based on the first time point, the second time point, and the first distance value; and perform the positioning based on the first RSTD value, wherein the first PRS may be transmitted by the second device at a third time point, wherein the second PRS may be transmitted by the third device at a fourth time point, which is after a time point at which the first PRS is received by the third device by a first time interval, and wherein the first distance value may be obtained based on the third time point, a fifth time point at which the second PRS is received by the second device, and the first time interval.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain information related to a sidelink (SL) positioning reference signal (PRS) resource, for positioning of the first UE; receive a first PRS at a first time point, from a second UE included in an SL positioning group for the positioning, based on the SL PRS resource; receive a second PRS at a second time point, from a third UE included in the SL positioning group, based on the SL PRS resource; receive, from the second UE, a first distance value between the second UE and the third UE; obtain a first reference signal time difference (RSTD) value between the second UE and the third UE, based on the first time point, the second time point, and the first distance value; and perform the positioning based on the first RSTD value, wherein the first PRS may be transmitted by the second device at a third time point, wherein the second PRS may be transmitted by the third device at a fourth time point, which is after a time point at which the first PRS is received by the third device by a first time interval, and wherein the first distance value may be obtained based on the third time point, a fifth time point at which the second PRS is received by the second device, and the first time interval.

According to an embodiment of the present disclosure, a non-transitory computer-readable storage medium storing instructions may be proposed. The instructions, when executed, may cause a first device to: obtain information related to a sidelink (SL) positioning reference signal (PRS) resource, for positioning of the first device; receive a first PRS at a first time point, from a second device included in an SL positioning group for the positioning, based on the SL PRS resource; receive a second PRS at a second time point, from a third device included in the SL positioning group, based on the SL PRS resource; receive, from the second device, a first distance value between the second device and the third device; obtain a first reference signal time difference (RSTD) value between the second device and the third device, based on the first time point, the second time point, and the first distance value; and perform the positioning based on the first RSTD value, wherein the first PRS may be transmitted by the second device at a third time point, wherein the second PRS may be transmitted by the third device at a fourth time point, which is after a time point at which the first PRS is received by the third device by a first time interval, and wherein the first distance value may be obtained based on the third time point, a fifth time point at which the second PRS is received by the second device, and the first time interval.

According to an embodiment of the present disclosure, a method for performing, by a second device, wireless communication may be proposed. For example, the method may comprise: obtaining information related to a sidelink (SL) positioning reference signal (PRS) resource, for positioning of a first device; transmitting a first PRS at a third time point, to the first device and a third device included in an SL positioning group for the positioning, based on the SL PRS resource; receiving a second PRS at a fifth time point, from the third device, based on the SL PRS resource; obtaining a first distance value between the second device and the third device, based on the third time point, the fifth time point, and a first time interval; and transmitting, to the first device, the first distance value, wherein the second PRS may be transmitted by the third device at a fourth time point which is after a time point at which the first PRS is received by the third device by the first time interval, wherein the first PRS is received by the first device at a first time point, wherein the second PRS may be received by the first device at a second time point, wherein a first reference signal time difference (RSTD) value between the second device and the third device may be obtained by the first device, based on the first time point, the second time point, and the first distance value, and wherein the positioning may be performed based on the first RSTD value.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain information related to a sidelink (SL) positioning reference signal (PRS) resource, for positioning of a first device; transmit a first PRS at a third time point, to the first device and a third device included in an SL positioning group for the positioning, based on the SL PRS resource; receive a second PRS at a fifth time point, from the third device, based on the SL PRS resource; obtain a first distance value between the second device and the third device, based on the third time point, the fifth time point, and a first time interval; and transmit, to the first device, the first distance value. For example, the second PRS may be transmitted by the third device at a fourth time point which is after a time point at which the first PRS is received by the third device by the first time interval, the first PRS may be received by the first device at a first time point, the second PRS may be received by the first device at a second time point, a first reference signal time difference (RSTD) value between the second device and the third device may be obtained by the first device, based on the first time point, the second time point, and the first distance value, and the positioning may be performed based on the first RSTD value.

DETAILED DESCRIPTION

Figure 1:
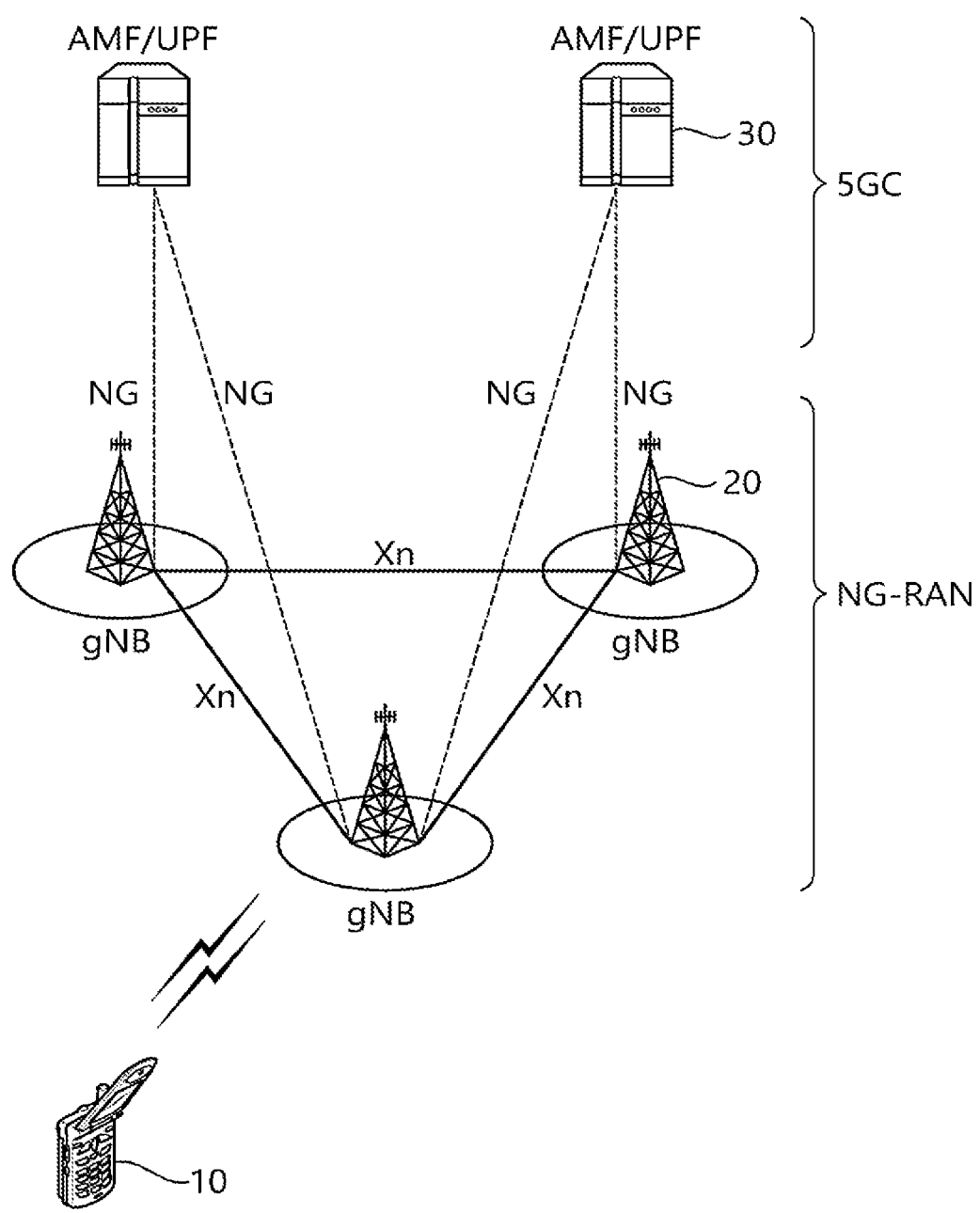
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
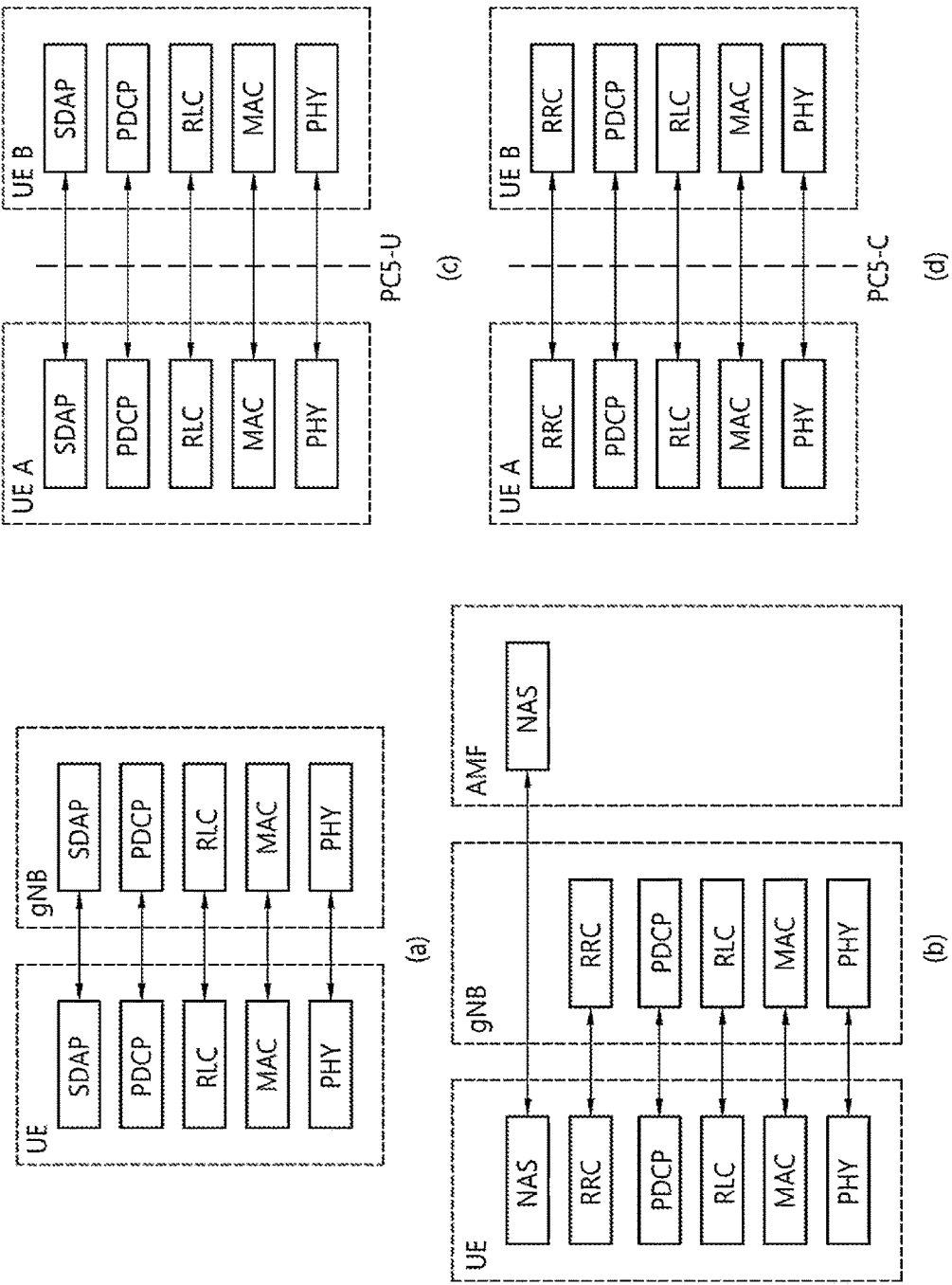
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
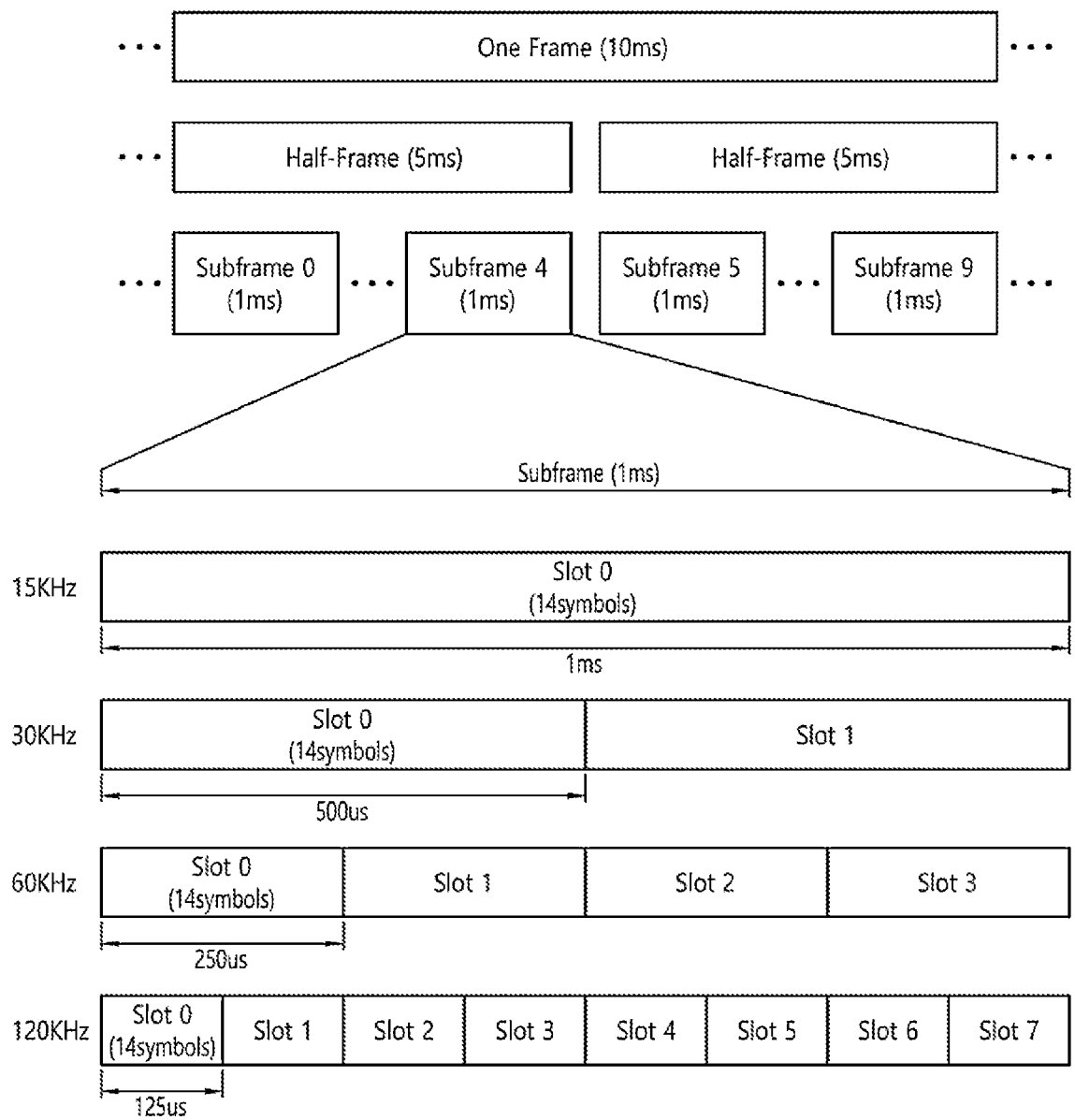
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be spread into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |

Table 2 shows an example of a number of symbols per slot, a number of slots per frame, and a number of slots per subframe based on the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 4:
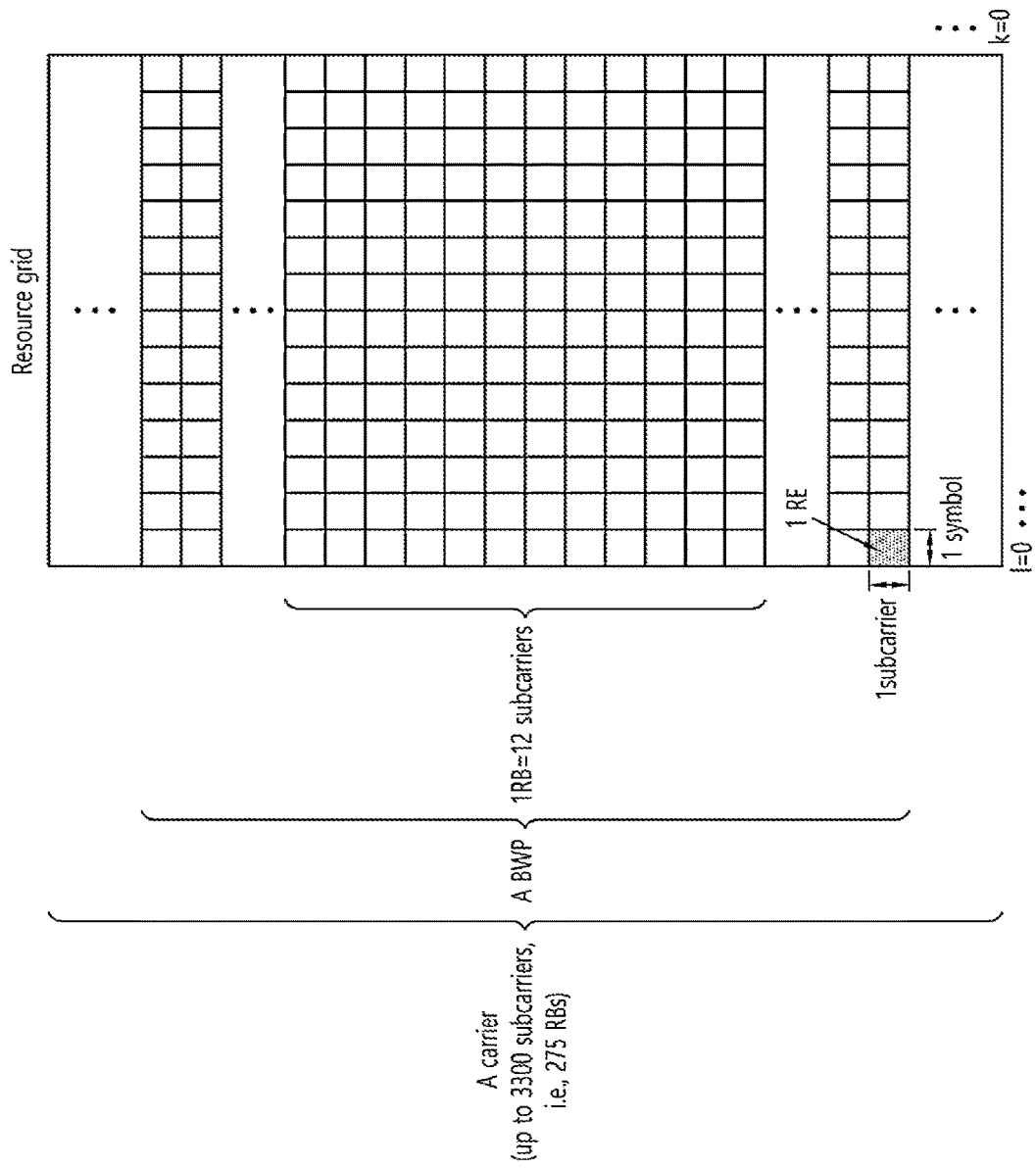
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on).

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
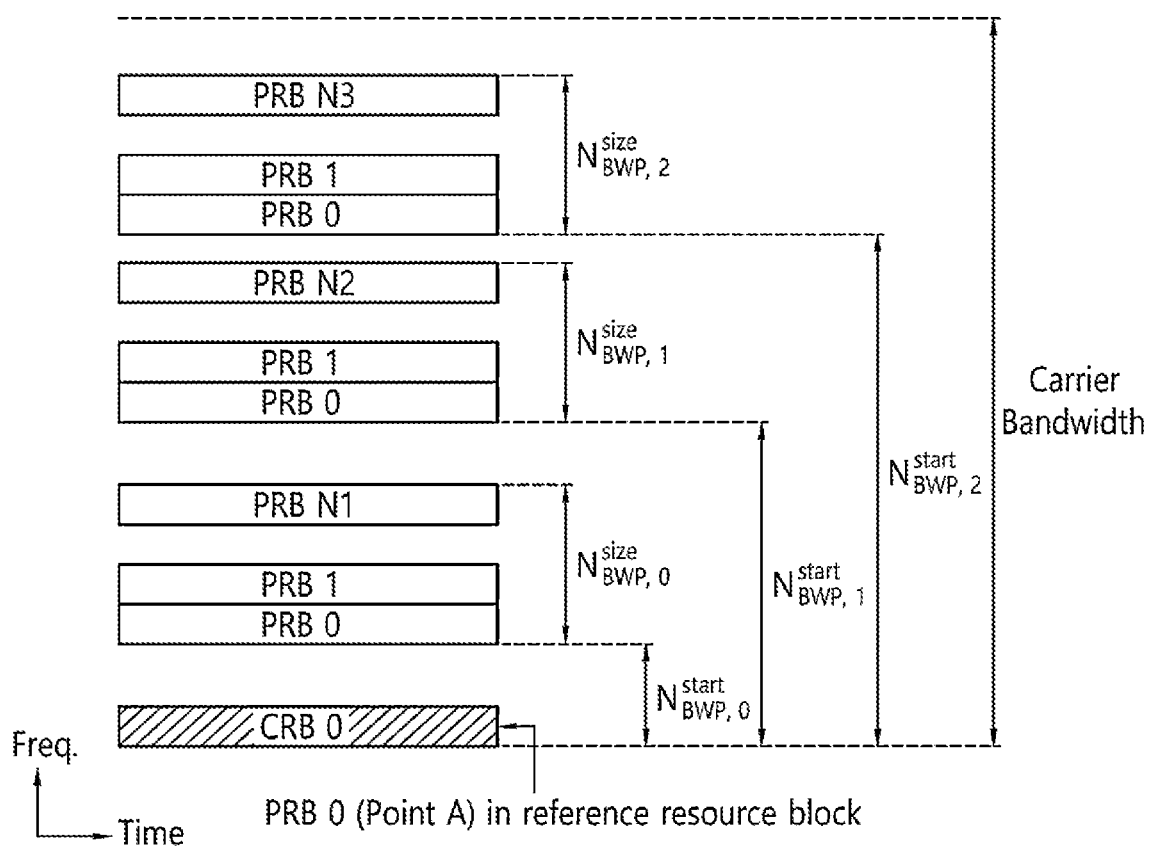
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{BWP}_{size}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
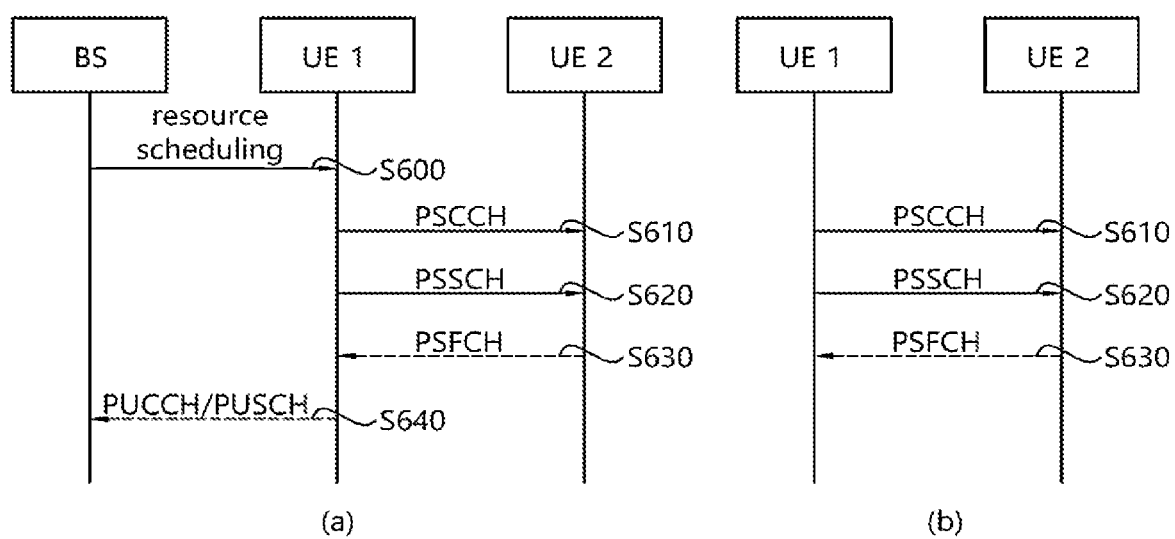
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
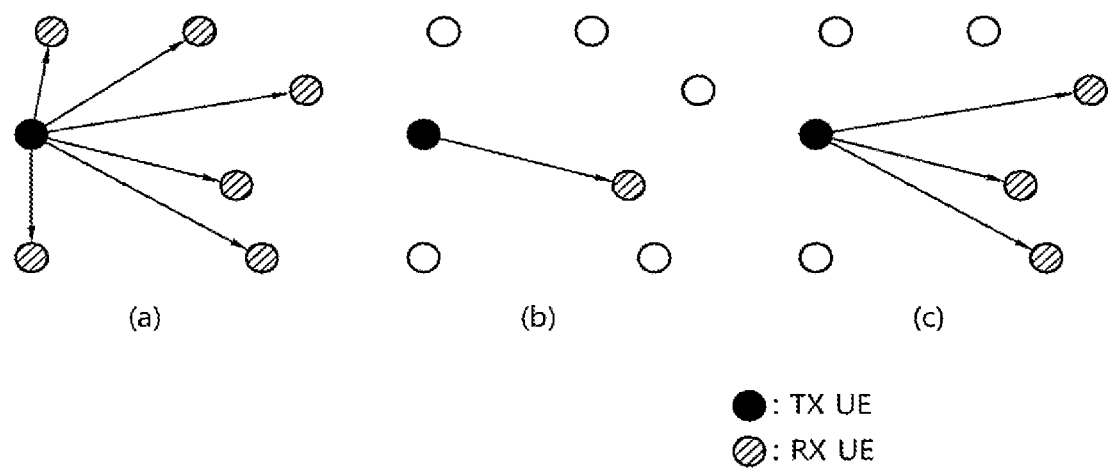
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(a) shows broadcast-type SL communication, FIG. 7(b) shows unicast type-SL communication, and FIG. 7(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In this specification, the "configure or define" wording may be interpreted as being (pre)configured (via pre-defined signaling (e.g., SIB, MAC signaling, RRC signaling)) from a base station or a network. For example, "A may be configured" may include "that a base station or network (pre-)configures/defines or informs A for a UE". Alternatively, the wording "configure or define" may be interpreted as being configured or defined in advance by a system. For example, "A may be configured" may include "A is configured/defined in advance by a system".

Figure 8:
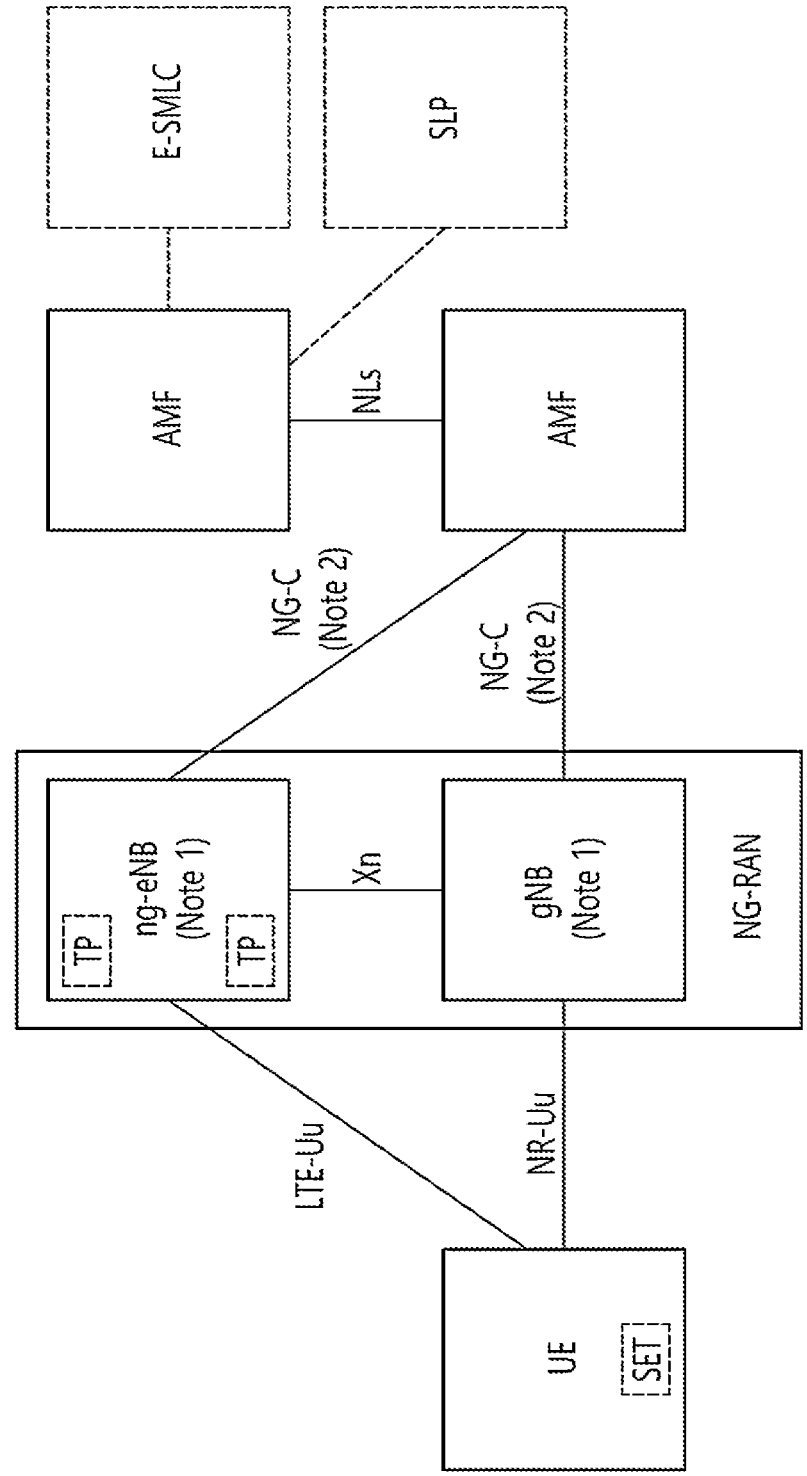
FIG. 8 shows an example of an architecture in a 5G system in which positioning for a UE connected to a Next Generation-Radio Access Network (NG-RAN) or E-UTRAN is possible, according to an embodiment of the present disclosure.

FIG. 8 shows an example of an architecture in a 5G system in which positioning for a UE connected to a Next Generation-Radio Access Network (NG-RAN) or E-UTRAN is possible, according to an embodiment of the present disclosure. The embodiment of FIG. 8 may be combined with various embodiments of the present disclosure.

Referring to FIG. 8, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated position or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for position estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centrer (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a position estimation value for the target UE and accuracy of position estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a position of the UE. For example, the UE may include an independent positioning function such as a global positioning system (GPS), and may report the position of the UE independent of NG-RAN transmission. Positioning information obtained independently as such may be utilized as assistance information of the positioning information obtained from the network.

Figure 9:
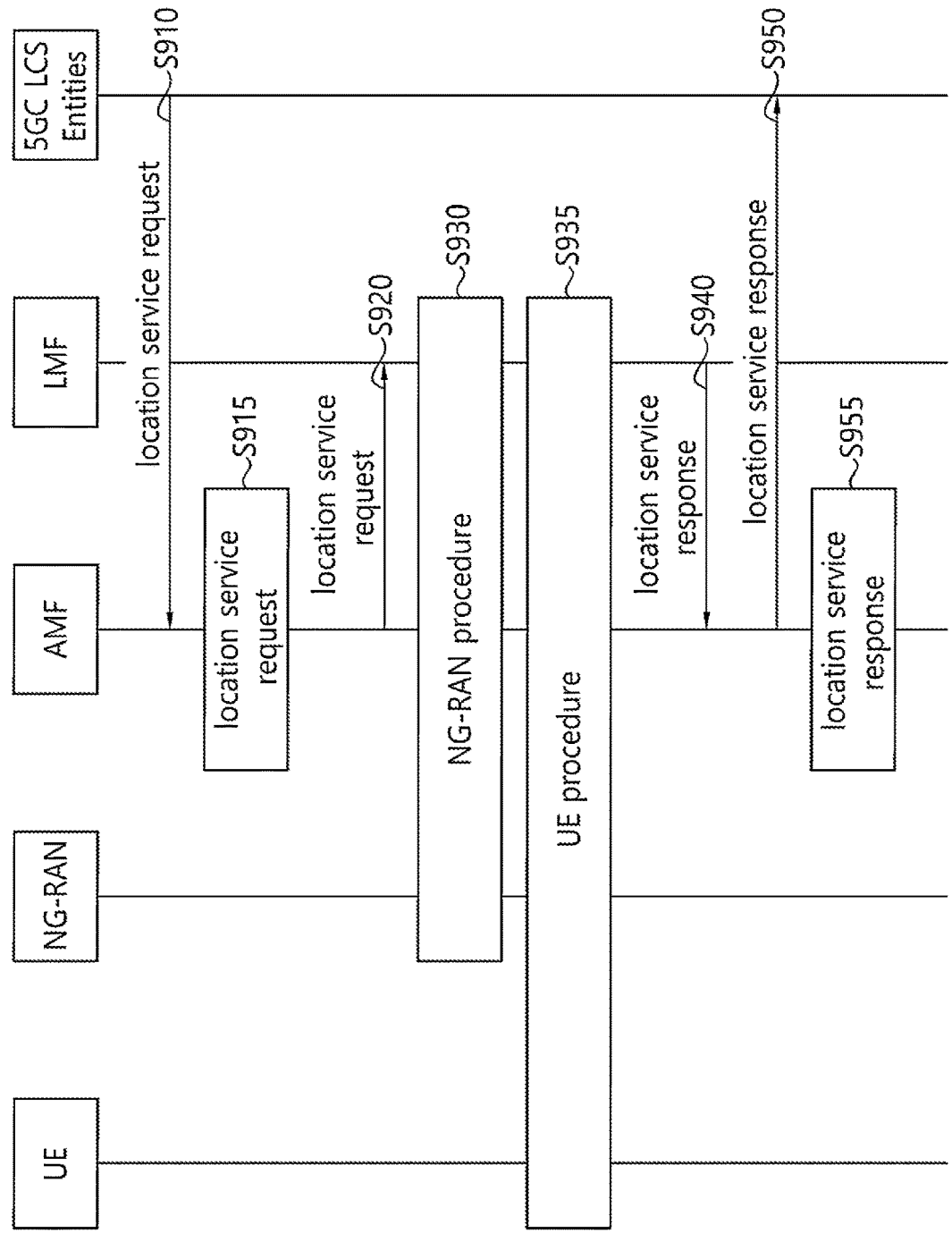
FIG. 9 shows an implementation example of a network for measuring a position of a UE, according to an embodiment of the present disclosure.

FIG. 9 shows an implementation example of a network for measuring a position of a UE, according to an embodiment of the present disclosure. The embodiment of FIG. 9 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 9. That is, it may be assumed in FIG. 9 that the UE is in a connected mode. However, due to signaling and data inactivation or the like, the signaling connection may be released by NG-RAN while a positioning process is performed.

A network operation process for measuring a position of a UE will be described in detail with reference to FIG. 9. In step S910, a 5GC entity such as GMLC may request a serving AMF to provide a location service for measuring a position of a target UE. However, even if the GMLC does not request for the location service, based on step S915, the serving AMF may determine that the location service for measuring the position of the target UE is required. For example, to measure the position of the UE for an emergency call, the serving AMF may determine to directly perform the location service.

Thereafter, the AMF may transmit the location service request to an LMF based on step S920, and the LMF may start location procedures to obtain position measurement data or position measurement assistance data together with a serving ng-eNB and a serving gNB, according to step S930. Additionally, based on step S935, the LMF may start location procedures for downlink positioning together with the UE. For example, the LMF may transmit assistance data defined in 3GPP TS 36.355, or may obtain a position estimation value or a position measurement value. Meanwhile, step S935 may be performed additionally after step S930 is performed, or may be performed instead of step S930.

In step S940, the LMF may provide a location service response to the AMF. In addition, the location service response may include information on whether position estimation of the UE is successful and a position estimation value of the UE. Thereafter, if the procedure of FIG. 9 is initiated by step S910, in step S950, the AMF may transfer the location service response to a 5GC entity such as GMLC, and if the procedure of FIG. 9 is initiated by step S915, in step S955, the AMF may use the location service response to provide a location service related to an emergency call or the like.

Figure 10:
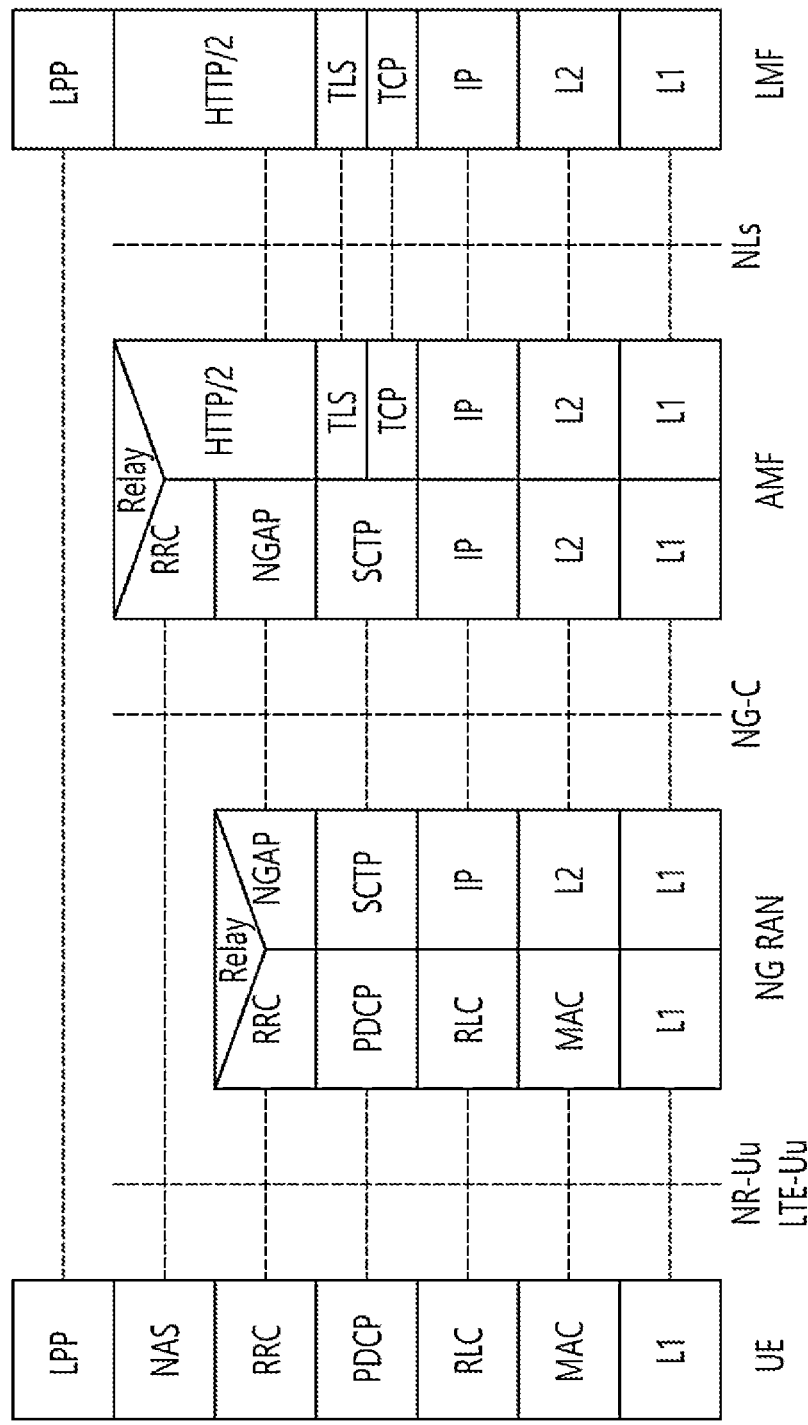
FIG. 10 shows an example of a protocol layer used to support LTE Positioning Protocol (LPP) message transmission between an LMF and a UE, according to an embodiment of the present disclosure.

FIG. 10 shows an example of a protocol layer used to support LTE Positioning Protocol (LPP) message transmission between an LMF and a UE, according to an embodiment of the present disclosure. The embodiment of FIG. 10 may be combined with various embodiments of the present disclosure.

An LPP PDU may be transmitted through a NAS PDU between an AMF and the UE. Referring to FIG. 10, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 11:
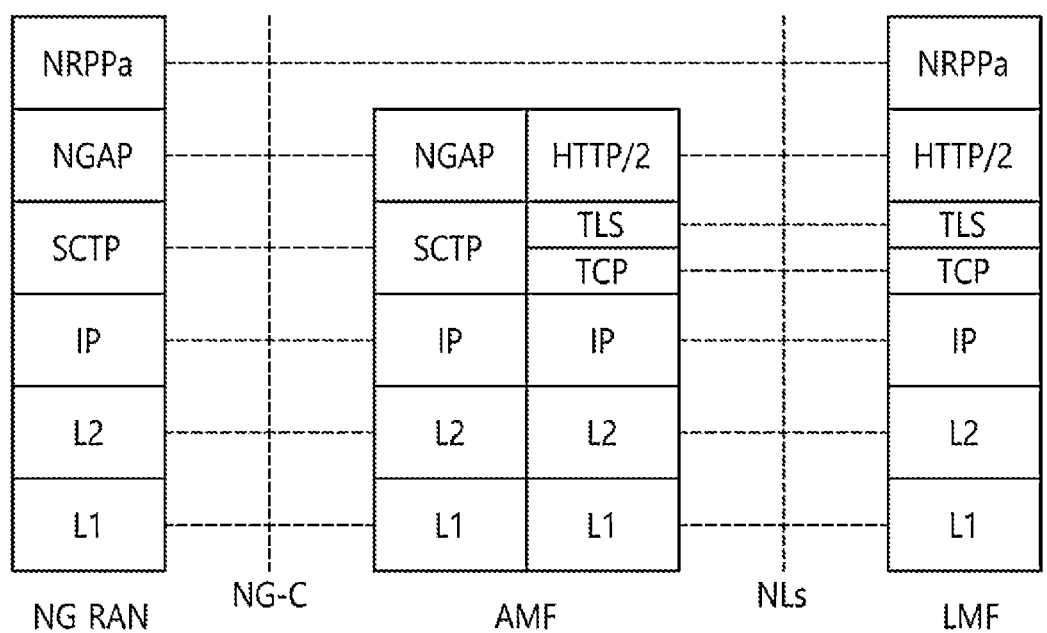
FIG. 11 shows an example of a protocol layer used to support NR Positioning Protocol A (NRPPa) PDU transmission between an LMF and an NG-RAN node, according to an embodiment of the present disclosure.

FIG. 11 shows an example of a protocol layer used to support NR Positioning Protocol A (NRPPa) PDU transmission between an LMF and an NG-RAN node, according to an embodiment of the present disclosure. The embodiment of FIG. 11 may be combined with various embodiments of the present disclosure.

Referring to FIG. 11, the NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., position measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference of Arrival)

Figure 12:
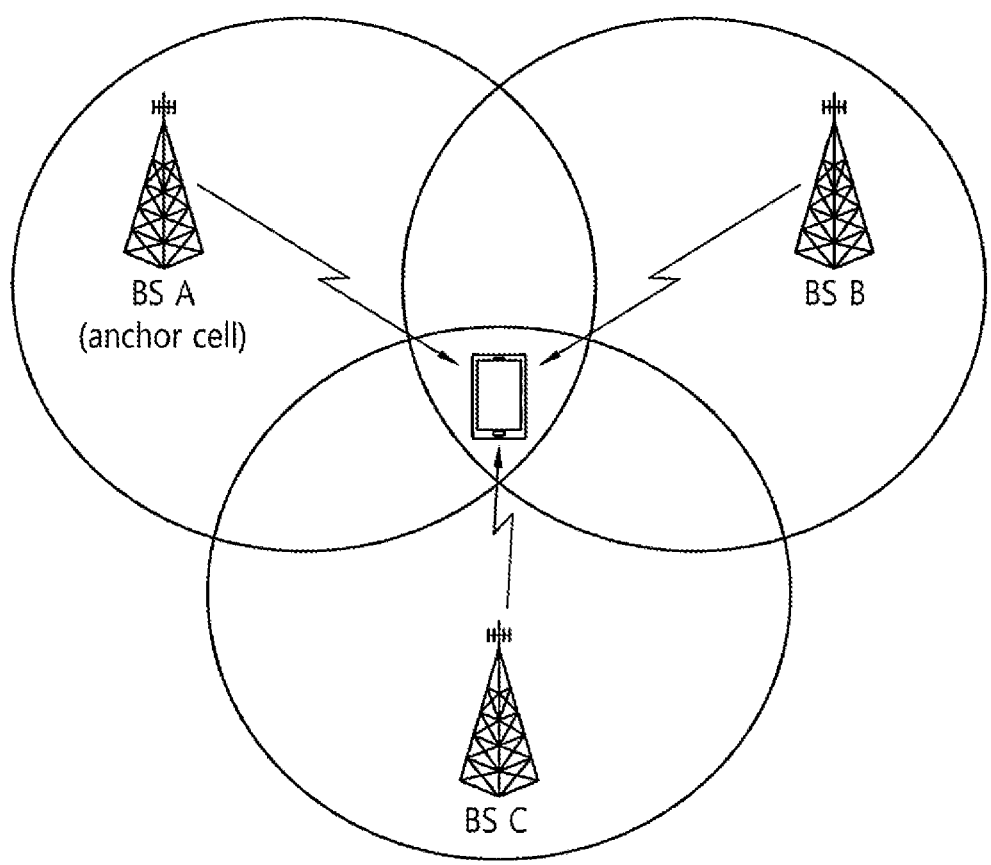
FIG. 12 shows an Observed Time Difference Of Arrival (OTDOA) positioning method according to an embodiment of the present disclosure.

FIG. 12 shows an Observed Time Difference Of Arrival (OTDOA) positioning method according to an embodiment of the present disclosure. The embodiment of FIG. 12 may be combined with various embodiments of the present disclosure.

Referring to FIG. 12, the OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a position of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BS s geometrically distributed. For example, a TOA may be measured for each of a TP1, a TP2, and a TP3, and RSTD for TP 1-TP 2, RSTD for TP 2-TP 3, and RSTD for TP 3-TP 1 may be calculated for the three TOAs. Based on this, a geometric hyperbola may be determined, and a point at which these hyperbolas intersect may be estimated as a position of a UE. In this case, since accuracy and/or uncertainty for each TOA measurement may be present, the estimated position of the UE may be known as a specific range based on measurement uncertainty.

For example, RSTD for two TPs may be calculated based on Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

Herein, c may be the speed of light, {xt, yt} may be a (unknown) coordinate of a target UE, {xi, yi} may be a coordinate of a (known) TP, and {x1, y1} may be a coordinate of a reference TP (or another TP). Herein, (Ti–T1) may be referred to as "real time differences (RTDs)" as a transmission time offset between two TPs, and ni, n1 may represent values related to UE TOA measurement errors.

(2) E-CID (Enhanced Cell ID)

In a cell ID (CID) positioning method, a position of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE position estimation value. In the E-CID positioning method, although some of the measurement methods which are the same as those used in a measurement control system of an RRC protocol may be used, additional measurement is not performed in general only for position measurement of the UE. In other words, a measurement configuration or a measurement control message may not be provided additionally to measure the position of the UE. Also, the UE may not expect that an additional measurement operation only for position measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx-Tx Time difference, GSM EDGE random access network (GERAN)/WLAN reference signal strength indication (RSSI), UTRAN common pilot channel (CPICH) received signal code power (RSCP), UTRAN CPICH Ec/Io E-UTRAN measurement: ng-eNB Rx-Tx Time difference, timing advance (TADV), angle of arrival (AoA)

Herein, the TADV may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

Meanwhile, AoA may be used to measure a direction of the UE. The AoA may be defined as an estimation angle with respect to the position of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a position of a UE by estimating an arrival time of SRS. When calculating an estimated SRS arrival time, the position of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

(4) RTT (Round Trip Time)

RTT is a positioning technology capable of measuring a distance between two entities even when time synchronization between a target entity and a server entity does not match. If RTT is performed with several server entities, the distances from each server entity are measured, and if a circle is drawn using the measured distance from each server entity, absolute positioning of the target entity may be performed based on a point where each circle intersects.

For example, a method for performing RTT between two entities is as follows. If entity #1 transmits PRS #1 at t1 and entity #2 receives the RRS #1 at t2, and after the entity #2 receives the PRS #1, if the entity #2 transmits the PRS #2 at t3, when entity #1 receives the PRS #2 at t4, the distance D between the two entities can be obtained as follows.

$$D=c*\{(t4-t1)-(t3-t2)\}/2 \text{ (Here, } c \text{ is the speed of light)}$$ [Equation 2]

For example, through the RTT between a UE and a gNB, the distance between the UE and the gNB can be obtained based on the above formula using the UE Rx-Tx time difference and the gNB reception-transmission time difference in Table 5 below.

In the present specification, sharing A between devices may mean i) that A is previously defined or configured for corresponding devices, or ii) that A is configured for corresponding devices (through signaling).

Referring to the standard document, some procedures and technical specifications related to the present disclosure are as follows.

TABLE 5

| | Reference signal time difference (RSTD) for E-UTRA |
|---|---|
| Definition | The relative timing difference between the E-UTRA neighbour cell j and the E-UTRA reference cell i, defined as $T_{SubframeRxj} - T_{SubframeRxi}$. |

TABLE 5-continued

Reference signal time difference (RSTD) for E-UTRA

|  |  |
| --- | --- |
|  | where: $T_{SubframeRxj}$ is the time when the UE receives the start of one subframe from E-UTRA cell j $T_{SubframeRxi}$ is the time when the UE receives the corresponding start of one subframe from E-UTRA cell i that is closest in time to the subframe received from E-UTRA cell j. The reference point for the observed subframe time difference shall be the antenna connector of the UE. |
| Applicable for | RRC_CONNECTED inter-RAT |

TABLE 6

DL PRS reference signal received power (DL PRS-RSRP)

| | |
| --- | --- |
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |

TABLE 7

DL relative signal time difference (DL RSTD)

| | |
| --- | --- |
| Definition | DL relative timing difference (DL RSTD) between the positioning node j and the reference positioning node i, is defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

TABLE 8

UE Rx – Tx time difference

| | |
| --- | --- |
| Definition | The UE Rx – Tx time difference is defined as $T_{UE\text{-}RX} - T_{UE\text{-}TX}$ Where: $T_{UE\text{-}RX}$ is the UE received timing of downlink subframe #i from a positioning node, defined by the first detected path in time. $T_{UE\text{-}TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE\text{-}RX}$ measurement shall be the Rx antenna connector of the UE and the reference point for $T_{UE\text{-}TX}$ measurement shall be the Tx antenna connector of the UE. For frequency range 2, the reference point for $T_{UE\text{-}RX}$ measurement shall be the Rx antenna of the UE and the reference point for $T_{UE\text{-}TX}$ measurement shall be the Tx antenna of the UE. |
| Applicable for | RRC_CONNECTED intra-frequency RRC_CONNECTED inter-frequency |

TABLE 9

| | UL Relative Time of Arrival ($T_{UL-RTOA}$) |
|---|---|
| Definition | [The UL Relative Time of Arrival ($T_{UL-RTOA}$) is the beginning of subframe i containing SRS received in positioning node j, relative to the configurable reference time.]<br>Multiple SRS resources for positioning can be used to determine the beginning of one subframe containing SRS received at a positioning node.<br>The reference point for $T_{UL-RTOA}$ shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector. |

15

TABLE 10

| | gNB Rx – Tx time difference |
|---|---|
| Definition | The gNB Rx – Tx time difference is defined as $T_{gNB-RX} - T_{gNB-TX}$<br>Where:<br>$T_{gNB-RX}$ is the positioning node received timing of uplink subframe #i containing SRS associated with UE, defined by the first detected path in time.<br>$T_{gNB-TX}$ is the positioning node transmit timing of downlink subframe #j that is closest in time to the subframe #i received from the UE.<br>Multiple SRS resources for positioning can be used to determine the start of one subframe containing SRS.<br>The reference point for $T_{gNB-RX}$ shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector.<br>The reference point for $T_{gNB-TX}$ shall be:<br>for type 1-C base station TS 38.104 [9]: the Tx antenna connector,<br>for type 1-O or 2-O base station TS 38.104 [9]: the Tx antenna,<br>for type 1-H base station TS 38.104 [9]: the Tx Transceiver Array Boundary connector. |

TABLE 11

| | UL Angle of Arrival (UL AoA) |
|---|---|
| Definition | UL Angle of Arrival (UL AoA) is defined as the estimated azimuth angle and vertical angle of a UE with respect to a reference direction, wherein the reference direction is defined:<br>In the global coordinate system (GCS), wherein estimated azimuth angle is measured relative to geographical North and is positive in a counter-clockwise direction and estimated vertical angle is measured relative to zenith and positive to horizontal direction<br>In the local coordinate system (LCS), wherein estimated azimuth angle is measured relative to x-axis of LCS and positive in a counter-clockwise direction and estimated vertical angle is measured relatize to z-axis of LCS and positive to x-y plane direction. The bearing, downtilt and slant angles of LCS are defined according to TS 38.901 [14].<br>The UL AoA is determined at the gNB antenna for an UL channel corresponding to this UE. |

TABLE 12

UL SRS reference signal received power (UL SRS-RSRP)

| | |
|---|---|
| Definition | UL SRS reference signal received power (UL SRS-RSRP) is defined as linear average of the power contributions (in [W]) of the resource elements carrying sounding reference signals (SRS). UL SRS-RSRP shall be measured over the configured resource elements within the considered measurement frequency bandwidth in the configured measurement time occasions.<br>For frequency range 1, the reference point for the UL SRS-RSRP shall be the antenna connector of the gNB. For frequency range 2, UL SRS-RSRP shall be measured based on the combined signal from antenna elements corresponding to a given receiver branch. For frequency range 1 and 2, if receiver diversity is in use by the gNB, the reported UL SRS-RSRP value shall not be lower than the corresponding UL SRS-RSRP of any of the individual receiver branches. |

TABLE 13

14.1.1.6 UE procedure for determining the subset of resources to be reported to higher layers in PSSCH resource selection in sidelink transmission mode 4 and in sensing measurement in sidelink transmission mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}$ = 10*SL_RESOURCE_RESELECTION_COUNTER, where SL_RESOURCE_RESELECTION_COUNTER is provided by higher layers [11].

. . .

If partial sensing is configured by higher layers then the following steps are used:

1) A candidate single-subframe resource for PSSCH transmission $R_{x,y}$ is defined as a set of $L_{subCH}$ contiguous sub-channels with sub-channel x + j in subframe $t_y^{SL}$ where j = 0, . . . , $L_{subCH}$ − 1. The UE shall determine by its implementation a set of subframes which consists of at least Y subframes within the time interval [n + $T_1$, n + $T_2$] where selections of $T_1$ and $T_2$ are up to UE implementations under $T_1$ ≤ 4 and $T_{2\ min}(prio_{TX})$ ≤ $T_2$ ≤ 100, if $T_{2\ min}(prio_{TX})$ is provided by higher layers for $prio_{TX}$, otherwise 20 ≤ $T_2$ ≤ 100. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i = (a − 1) * 8 + b.

TABLE 14

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{Rx}$, respectively according to Subclause 14.2.1.
   PSSCH-RSRP measurement according to the received SCI format 1 is higher than $Th_{prio_{TX},prio_{RX}}$.

TABLE 14-continued the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}}$ for q = 1, 2, . . . , Q and j = 0, 1, . . . , $C_{resel}$ − 1. Here, $Q = \dfrac{1}{P_{rsvp\_RX}}$ if $P_{rsvp\_RX} < 1$ and y' − m ≤ $P_{step} \times P_{rsvp\_RX} + P_{step}$, where $t_{y'}^{SL}$ is the last subframe of the Y subframes , and Q = 1 otherwise.

6) If the number of candidate single-subframe resources remaining in the set $S_A$ is smaller than 0.2 · $M_{total}$, then Step 4 is repeated with $Th_{a,b}$ increased by 3 dB.
7) For a candidate single-subframe resource $R_{x,y}$ remaining in the set $S_A$, the metric $E_{x,y}$ is defined as the linear average of S-RSSI measured in sub-channels x + k for k = 0, . . . , $L_{subCH}$ − 1 in the monitored subframes in Step 2 that can be expressed by $t_{y-P_{step} \ast j}^{SL}$ for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2 · $M_{total}$.
9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

TABLE 15

The UE shall report set $S_B$ to higher layers.
If transmission based on random selection is configured by upper layers and when the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub-channels with sub-channel x + j in subframe $t_y^{SL}$ where j = 0, . . . , $L_{subCH}$ − 1. The UE shall assume that any set of $L_{subCH}$ contiguous sub-channels included in the corresponding PSSCH resource pool (described in 14.1.5) within the time interval [n + $T_1$, n + $T_2$] corresponds to one candidate single-subframe resource, where selections of $T_1$ and $T_2$ are up to UE implementations under $T_1$ ≤ 4 and $T_{2min}(prio_{TX})$ ≤ $T_2$ ≤ 100, if $T_{2min}(prio_{TX})$ is provided by higher layers for $prio_{TX}$, otherwise 20 ≤ $T_2$ ≤ 100. UE selection of $T_2$ shall fulfil the latency requirement. The total number of the candidate single-subframe resources is denoted by $M_{total}$.
2) The set $S_A$ is initialized to the union of all the candidate single-subframe resources. The set $S_B$ is initialized to an empty set.
3) The UE moves the candidate single-subframe resource $R_{x,y}$ from the set $S_A$ to $S_B$.
4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

TABLE 16

UE procedure for determining the subset of resources to be reported to higher layers in PSSCH resource selection in sidelink resource allocation mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
- the resource pool from which the resources are to be reported;
- L1 priority, $prio_{TX}$;
- the remaining packet delay budget;
- the number of sub-channels to be used for the PSSCH/PSCCH transmission in a slot, $L_{subCH}$;
- optionally, the resource reservation interval, $P_{rsvp\_TX}$, in units of msec.

TABLE 16-continued

- if the higher layer requests the UE to determine a subset of resources from which the higher layer will select resources for PSSCH/PSCCH transmission as part of re-evaluation or pre-emption procedure, the higher layer provides a set of resources ($r_0$, $r_1$, $r_2$, . . . ) which may be subject to re-evaluation and a set of resources ($r'_0$, $r'_1$, $r'_2$, . . . ) which may be subject to pre-emption.
  - it is up to UE implementation to determine the subset of resources as requested by higher layers before or after the slot $r''_i - T_3$, where $r''_i$ is the slot with the smallest slot index among ($r_0$, $r_1$, $r_2$, . . . ) and ($r'_0$, $r'_1$, $r'_2$, . . . ), and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

The following higher layer parameters affect this procedure:
- sl-SelectionWindowList: internal parameter $T_{2min}$ is set to the corresponding value from higher layer parameter sl-SelectionWindowList for the given value of $prio_{TX}$.
- sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = prio_{TX}$.
- sl-RS-ForSensing selects if the UE uses the PSSCH-RSRP or PSCCH-RSRP measurement, as defined in clause 8.4.2.1.
- sl-ResourceReservePeriodList
- sl-SensingWindow: internal parameter $T_0$ is defined as the number of slots corresponding to sl-SensingWindow msec
- sl-TxPercentageList: internal parameter X for a given $prio_{TX}$ is defined as sl-TxPercentageList ($prio_{TX}$) converted from percentage to ratio
- sl-PreemptionEnable: if sl-PreemptionEnable is provided, and if it is not equal to 'enabled', internal parameter $prio_{pre}$ is set to the higher layer provided parameter sl-PreemptionEnable The resource reservation interval, $P_{rsvp\_TX}$, if provided, is converted from units of msec to units of logical slots, resulting in $P'_{rsvp\_TX}$ according to clause 8.1.7.

Notation:
($t'_0{}^{SL}$, $t'_1{}^{SL}$, $t'_2{}^{SL}$, . . . ) denotes the set of slots which belongs to the sidelink resource pool and is defined in Clause 8.

TABLE 17

The following steps are used:
1) A candidate single-slot resource for transmission $R_{x,y}$ is defined as a set of $L_{subCH}$ contiguous sub-channels with sub-channel $x + j$ in slot $t'_y{}^{SL}$ where $j = 0, \ldots, L_{subCH} - 1$. The UE shall assume that any set of $L_{subCH}$ contiguous sub-channels included in the corresponding resource pool within the time interval [n + $T_1$, n + $T_2$] correspond to one candidate single-slot resource, where
   selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;
   if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).
   The total number of candidate single-slot resources is denoted by $M_{total}$.
2) The sensing window is defined by the range of slots [n − $T_0$, n − $T_{proc,0}^{SL}$) where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter Th($p_i$, $p_j$) is set to the corresponding value of RSRP threshold indicated by the i-th field in sl-Thres-RSRP-List, where $i = p_i + (p_j - 1) * 8$.
4) The set $S_A$ is initialized to the set of all the candidate single-slot resources.
5) The UE shall exclude any candidate single-slot resource $R_{x,y}$ from the set $S_A$ if it meets all the following conditions:
   the UE has not monitored slot $t'_m{}^{SL}$ in Step 2.
   for any periodicity value allowed by the higher layer parameter sl-ResourceReservePeriodList and a hypothetical SCI format 1-A received in slot $t'_m{}^{SL}$ with 'Resource reservation period' field set to that periodicity value and indicating all subchannels of the resource pool in this slot, condition c in step 6 would be met.
5a) If the number of candidate single-slot resources $R_{x,y}$ remaining in the set $S_A$ is smaller than $X \cdot M_{total}$, the set $S_A$ is initialized to the set of all the candidate single-slot resources as in step 4.

TABLE 17-continued

6) The UE shall exclude any candidate single-slot resource $R_{x,y}$ from the set $S_A$ if it meets all the following conditions:
   a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];
   b) the RSRP measurement performed, according to clause 8.4.2.1 for the received SCI format 1-A, is higher than $Th(prio_{RX}, prio_{TX})$;
   c) the SCI format received in slot $t'^{SL}_m$ or the same SCI format which, if and only if the 'Resource reservation period' field is present in the received SCI format 1-A, is assumed to be received in slot(s) $t'^{SL}_{m+q \times P'_{rsvp\_RX}}$ determines according to clause 8.1.5 the set of resource blocks and slots which overlaps with
   $R_{x,y+j \times P'_{rsvp\_TX}}$ for $q = 1, 2, \ldots, Q$ and $j = 0, 1, \ldots, C_{resel} - 1$. Here, $P'_{rsvp\_RX}$ is
   $P_{rsvp\_RX}$ converted to units of logical slots according to clause 8.1.7, $Q = \left\lceil \dfrac{T_{scal}}{P'_{rsvp\_RX}} \right\rceil$
   if $P_{rsvp\_RX} < T_{scal}$ and $n' - m \le P'_{rsvp\_RX}$, where $t'^{SL}_n = n$ if slot n belongs to the set $(t'^{SL}_0, t'^{SL}_1, \ldots, t'^{SL}_{T_{max}-1})$, otherwise slot $t'^{SL}_n$ is the first slot after slot n belonging to the set $(t'^{SL}_0, t'^{SL}_1, \ldots, t'^{SL}_{T_{max}-1})$; otherwise $Q = 1$. $T_{scal}$ is set to selection window size $T_2$ converted to units of msec.
7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

TABLE 18

The UE shall report set SA to higher layers.
If a resource $r_i$ from the set $(r_0, r_1, r_2, \ldots)$ is not a member of $S_A$, then the UE shall report re-evaluation of the resource $r_i$ to higher layers.
If a resource $r'_i$ from the set $(r'_0, r'_1, r'_2, \ldots)$ meets the conditions below then the UE shall report pre-emption of the resource $r'_i$ to higher layers
- $r'_i$ is not a member of $S_A$, and
- $r'_i$ meets the conditions for exclusion in step 6, with $Th(prio_{RX}, prio_{TX})$ set to the final threshold after executing steps 1)-7), i.e. including all necessary increments for reaching $X \cdot M_{total}$, and
- the associated priority $prio_{RX}$, satisfies one of the following conditions:
  - sl-PreemptionEnable is provided and is equal to 'enabled' and $prio_{TX} > prio_{RX}$
  - sl-PreemptionEnable is provided and is not equal to 'enabled', and $prio_{RX} \le prio_{pre}$ and $prio_{TX} > prio_{RX}$

TABLE 19

$T^{SL}_{proc,0}$ depending on sub-carrier spacing

| $\mu_{SL}$ | $T^{SL}_{proc,0}$ [slots] |
|---|---|
| 0 | 1 |
| 1 | 1 |
| 2 | 2 |
| 3 | 4 |

TABLE 20

$T^{SL}_{proc,1}$ depending on sub-carrier spacing

| $\mu_{SL}$ | $T^{SL}_{proc,1}$ [slots] |
|---|---|
| 0 | 3 |
| 1 | 5 |
| 2 | 9 |
| 3 | 17 |

Meanwhile, a case in which time synchronization between UEs does not match may be common. For example, in order to use a positioning scheme such as SL TDOA, it is necessary to reduce performance degradation due to a time synchronization error between UEs.

According to an embodiment of the present disclosure, when SL TDOA is performed, a method for minimizing performance degradation due to a time synchronization error between UEs and a device supporting the same are proposed.

For example, for (or, for each of) at least one among elements/parameters of service type (and/or (LCH or service) priority and/or QOS requirements (e.g., latency, reliability, minimum communication range) and/or PQI parameters) (and/or HARQ feedback enabled (and/or disabled) LCH/MAC PDU (transmission) and/or CBR measurement value of a resource pool and/or SL cast type (e.g., unicast, groupcast, broadcast) and/or SL groupcast HARQ feedback option (e.g., NACK only feedback, ACK/NACK feedback, NACK only feedback based on TX-RX distance) and/or SL mode 1 CG type (e.g., SL CG type 1/2) and/or SL mode type (e.g., mode 1/2) and/or resource pool and/or PSFCH resource configured resource pool and/or source (L2) ID (and/or destination (L2) ID) and/or PC5 RRC connection/link and/or SL link and/or (with base station) connection state (e.g., RRC connected state, IDLE state, inactive state) and/or whether an SL HARQ process (ID) and/or (of a transmitting UE or a receiving UE) performs an SL DRX operation and/or whether it is a power saving (transmitting or receiving) UE and/or (from the perspective of a specific UE) case when PSFCH transmission and PSFCH reception (and/or a plurality of PSFCH transmissions (exceeding UE capability))) overlap (and/or a case where PSFCH transmission (and/or PSFCH reception) is omitted) and/or a case where a receiving UE actually (successfully) receives a PSCCH (and/or PSSCH) (re)transmission from a transmitting UE, etc.), whether the rule is applied (and/or the proposed method/rule-related parameter value of the present disclosure) may be specifically (or differently or independently) configured/allowed. In addition, in the present disclosure, "configuration" (or "designation") wording may be extended and interpreted as a form in which a base station informs a UE through a predefined (physical layer or higher layer) channel/signal (e.g., SIB, RRC, MAC CE) (and/or a form provided through pre-configuration and/or a form in which a UE informs other UEs through a predefined (physical layer or higher layer) channel/signal (e.g., SL MAC CE, PC5 RRC)), etc. In addition, in this disclosure, the "PSFCH" wording may be extended and interpreted as "(NR or LTE) PSSCH (and/or (NR or LTE) PSCCH) (and/or (NR or LTE) SL SSB (and/or UL channel/signal))". And, the methods proposed in the present disclosure may be used in combination with each other (in a new type of manner).

For example, the term "specific threshold" below may refer to a threshold value defined in advance or (pre-) configured by a higher layer (including an application layer) of a network, a base station, or a UE. Hereinafter, the term "specific configuration value" may refer to a value defined in advance or (pre-)configured by a higher layer (including an application layer) of a network, a base station, or a UE. Hereinafter, "configured by a network/base station" may mean an operation in which a base station configures (in advance) a UE by higher layer RRC signaling, configures/signals a UE through MAC CE, or signals a UE through DCI.

In the following disclosure, the following terms are used.
UE-triggered SL positioning—sidelink (SL) positioning where the procedure is triggered by UE
gNB/LMF-triggered SL positioning—SL positioning where the procedure is triggered by gNB/LMF
UE-controlled SL positioning—SL positioning where the SL positioning group is created by UE
gNB-controlled SL positioning—SL positioning where the SL positioning group is created by gNB
UE-based SL positioning—SL positioning where the UE position is calculated by UE
UE-assisted SL positioning—SL positioning where the UE position is calculated by gNB/LMF
SL positioning group—UEs that participates in SL positioning
Target UE (T-UE)—UE whose position is calculated
Server UE (S-UE)—UE that assists T-UE's SL positioning
LS—location server
MG—measurement gap where only SL PRS transmission is allowed
MW—measurement window where both SL data and SL PRS can be transmitted in a multiplexed way According to an embodiment of the present disclosure, an SL PRS transmission resource may be composed of an SL PRS resource set composed of the following information. Or, for example, information related to SL PRS transmission resources may include some or all of the following information.
1. SL PRS resource set ID
2. SL PRS resource ID list: an SL PRS resource ID list in an SL PRS resource set
3. SL PRS resource type: it can be configured as periodic, aperiodic, semi-persistent, or on-demand.
4. Alpha value for SL PRS power control
5. P0 value for SL PRS power control
6. Pathloss reference for SL PRS power control: it can be configured as SL synchronization signal block (SSB), downlink (DL) PRS, uplink (UL) sounding reference signal (SRS), SL SRS for positioning, PSCCH DMRS, PSSCH DMRS, PSFCH, or SL CSI RS etc.

According to an embodiment of the present disclosure, an SL PRS resource set may be composed of an SL PRS resource composed of the following information. Or, for example, information related to the SL PRS transmission resource may include some or all of the following information.
1. SL PRS resource ID
2. SL PRS comb size: an interval between REs at which an SL PRS is transmitted within a symbol.
3. SL PRS comb offset: an index of a RE at which an SL PRS is initially transmitted within the first SL PRS symbol.
4. SL PRS comb cyclic shift: cyclic shift used to generate the sequence constituting the SL PRS.
5. SL PRS start position: an index of the first symbol in which SL PRS is transmitted within one slot.
6. SL PRS #symbol: the number of symbols constituting SL PRS within one slot
7. Frequency domain shift: position (of an index) of the lowest frequency at which SL PRS is transmitted in the frequency domain
8. SL PRS BW: Frequency Bandwidth Used for SL PRS Transmission
9. SL PRS resource type: it can be configured as periodic, aperiodic, semi-persistent, or on-demand.
10. SL PRS periodicity: it is a period in the time domain between SL PRS resources, and has a physical or logical slot unit of a resource pool in which the SL PRS is transmitted.
11. SL PRS offset: Reference timing Reference, an offset in the time domain to the start of the first SL PRS resource, and it has units of physical or logical slots of resource pools in which SL PRSs are transmitted. For example, the reference timing may be SFN=0, DFN=0, or a successful reception or decoding time of RRC/MAC CE/DCI/SCI related to the SL PRS resource.
12. SL PRS sequence ID
13. SL PRS spatial relation: It can be configured to SL SSB, DL PRS, UL SRS, UL SRS for positioning, PSCCH DMRS, PSSCH DMRS, PSFCH, or SL CSI RS.
14. SL PRS CCH: SL PRS control channel. For example, SL PRS resource configuration information and resource location may be signaled through the SL PRS CCH.

According to an embodiment of the present disclosure, when SL TDOA is performed, three or more S-UEs may transmit SL PRS to a T-UE. At this time, for example, the T-UE may calculate a hyperbola based on the time difference between receiving the SL PRS (RSTD; reference signal time difference) from two S-UEs, and can estimate the location of the T-UE based on the intersection point with the hyperbola obtained from the other two S-UEs.

Figure 13:
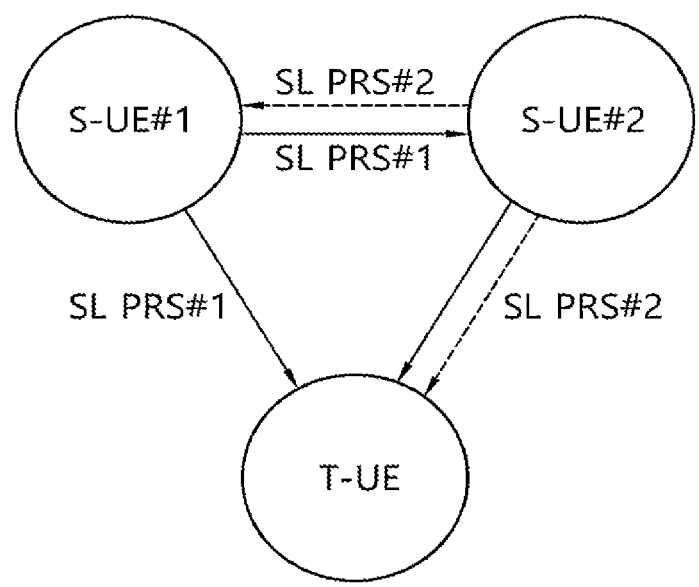
FIG. 13 shows an embodiment in which a T-UE measures RSTD according to an embodiment of the present disclosure.

FIG. 13 shows an embodiment in which a T-UE measures RSTD according to an embodiment of the present disclosure. The embodiment of FIG. 13 may be combined with various embodiments of the present disclosure.

Referring to FIG. 13, for example, in the above case, a T-UE may cancel the time synchronization error between two UEs (S-UEs) to measure the RSTD from an RSTD measurement value in the following manner.

1. S-UE #1 simultaneously transmits the same SL PRS #1 to T-UE and S-UE #2.
2. The S-UE #2 receives the SL PRS #1, and transmits the same SL PRS #2 to the T-UE and the S-UE #1 at the same time after a specific configuration value time interval (T).
3. The S-UE #1 and the S-UE #2 measure the distance between the S-UE #1 and the S-UE #2 by performing SL RTT based on the SL PRS #1 and SL PRS #2, and transmit the measured distance value (L) to the T-UE.
4. The T-UE calculates the RSTD between the S-UEs based on the time point at which the SL PRS #1 is received (t1), the time point at which the SL PRS #2 is received (t2), the time interval of the specific configuration value (T), and the measured distance (L) between the S-UE as follows.

$$t1=t0+L1/c$$

$$t2=t0+L/c+T+L2/c$$

$$RSTD=(t2-t1)-L/c-T=(L2-L1)/c \quad \text{[Equation 3]}$$

For example, referring to Equation 3, it may be t0=time of transmission of SL PRS #1, L1=distance between S-UE #1 and T-UE, L2=distance between S-UE #2 and T-UE, c=the speed of light.

5. Since the T-UE estimates the location of the T-UE based on two or more RSTD estimation values after performing the above process for a pair of the S-UE #1 and other S-UEs (e.g., S-UE #3), an effect of removing a time synchronization error between the S-UEs may occur. Accordingly, the T-UE can estimate the RSTD value between the S-UEs regardless of the time synchronization error between the S-UEs.

For example, as described above, since the time point at which the T-UE receives SL PRS #2 from S-UE #2 (t2) can be calculated based on the distance (L) between the S-UEs and the time interval (T) of the specific configuration value, and the time point (t0) at which the S-UE #1 transmitted the SL PRS #1, regardless of the time synchronization error between the S-UEs, the T-UE can calculate the RSTD for SL PRSs transmitted by the S-UE #1 and S-UE #2. Due to this, the positioning performance of the SL TDOA performed based on the above operation may not be affected by a time synchronization error between S-UEs.

Figure 14:
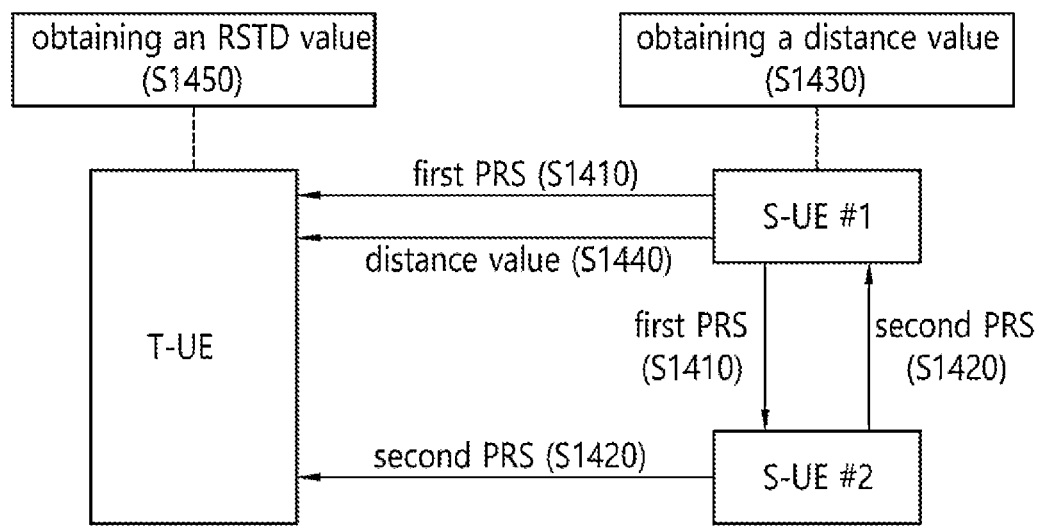
FIG. 14 shows an embodiment in which a T-UE measures RSTD according to an embodiment of the present disclosure.

FIG. 14 shows an embodiment in which a T-UE measures RSTD according to an embodiment of the present disclosure. The embodiment of FIG. 14 may be combined with various embodiments of the present disclosure.

Referring to FIG. 14, a target UE (T-UE) trying to locate itself, that is, performing positioning and server UE (S-UE) #1 and S-UE #2 included in the positioning group for helping the positioning are represented.

In step S1410, the S-UE #1 may simultaneously transmit a first PRS to the T-UE and the S-UE #2 at a first time point. Here, the T-UE may receive the first PRS at a second time point, and the S-UE #2 may receive the first PRS at a third time point.

In step S1420, the S-UE #2 may simultaneously transmit a second PRS to the S-UE #1 and the T-UE at a fourth time point after a specific time value (T) from the third time point. Here, the T-UE may receive the second PRS at a fifth time point, and the S-UE #1 may receive the second PRS at a sixth time point. For example, the specific time value may be a value shared as the same value among the T-UE, S-UE #1, and S-UE #2.

In step S1430, the S-UE #1 may measure a distance value between the S-UE #1 and the S-UE #2 based on the first time point, the sixth time point, and the specific time value. In step S1440, the S-UE #1 may transmit the measured distance value to the T-UE.

In step S1450, the T-UE may obtain an RSTD value between the S-UE #1 and the S-UE #2 based on the second time point, the fifth time point, and the distance value. For example, the T-UE may then perform positioning based on the RSTD value. For example, the positioning may be performed based on various positioning methods proposed in the present disclosure.

Figure 15:
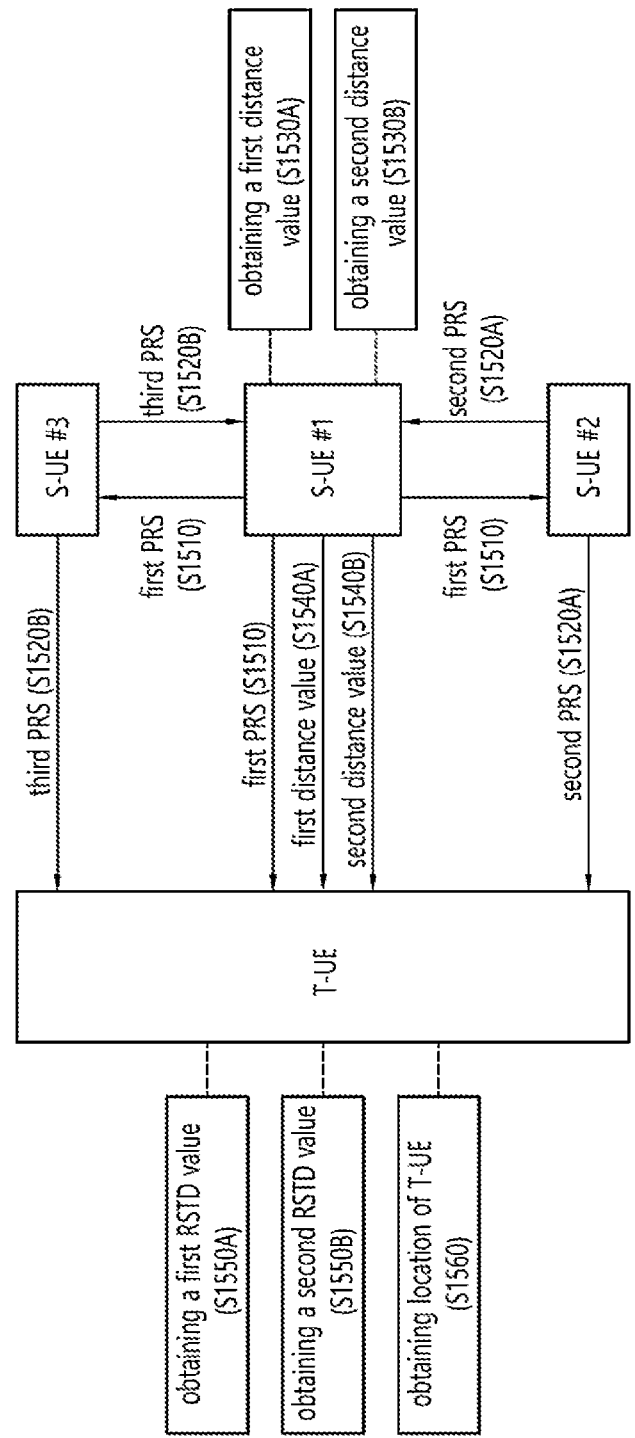
FIG. 15 shows an embodiment in which a T-UE performs positioning based on two RSTDs according to an embodiment of the present disclosure.

FIG. 15 shows an embodiment in which a T-UE performs positioning based on two RSTDs according to an embodiment of the present disclosure. The embodiment of FIG. 15 may be combined with various embodiments of the present disclosure.

Referring to FIG. 15, a T-UE trying to locate itself, that is, performing positioning, and S-UE #1, S-UE #2, and S-UE #3 included in a positioning group to help the positioning are presented.

In step S1510, the S-UE #1 may simultaneously transmit a first PRS to the T-UE, the S-UE #2, and the S-UE #3 at a first time point. Here, the T-UE may receive the first PRS at a second time point, the S-UE #2 may receive the first PRS at a third time point, and the S-UE #3 may receive the first PRS at a fourth time point.

In step S1520A, the S-UE #2 may simultaneously transmit a second PRS to the S-UE #1 and the T-UE at a fifth time point that is after a specific time value (T) from the third time point. Here, the T-UE may receive a second PRS at a sixth time point, and the S-UE #1 may receive the second PRS at a seventh time point. For example, the specific time value may be a value shared as the same value among the T-UE, S-UE #1, S-UE #2, and S-UE #3.

In step S1530A, the S-UE #1 may measure a distance value (a first distance value) between the S-UE #1 and the S-UE #2 based on the first time point, the seventh time point, and the specific time value. In step S1540A, the S-UE #1 may transmit the measured first distance value to the T-UE.

In step S1550A, the T-UE may obtain a first RSTD value between the S-UE #1 and the S-UE #2 based on the second time point, the sixth time point, and the distance value.

Meanwhile, in step S1520B, the S-UE #3 may simultaneously transmit a third PRS to the S-UE #1 and the T-UE at an eighth time point after the specific time value from the fourth time point. Here, the T-UE may receive the second PRS at a ninth time point, and the S-UE #1 may receive the second PRS at a tenth time point. For example, the specific time value may be a value shared as the same value among the T-UE, S-UE #1, S-UE #2, and S-UE #3.

In step S1530B, the S-UE #1 may measure a distance value (second distance value) between the S-UE #1 and the S-UE #3 based on the first time point, the tenth time point, and the specific time value. In step S1540B, the S-UE #1 may transmit the measured second distance value to the T-UE.

In step S1550B, the T-UE may obtain a second RSTD value between the S-UE #1 and the S-UE #3 based on the second time point, the ninth time point, and the distance value.

Finally, in step S1560, the T-UE may obtain its location by performing positioning for itself using the first RSTD value and the second RSTD value. For example, the positioning may be performed based on various positioning methods proposed in the present disclosure.

According to various embodiments of the present disclosure, a method for attenuating an error due to time synchronization between S-UEs by a T-UE receiving SL PRSs, by a method of relaying PRSs between S-UEs transmitting the SL PRSs, when SL TDOA is performed, has been proposed.

According to the existing positioning technology, since the time synchronization of each S-UE may be different, accurate measurement of RSTD values was difficult. On the other hand, according to an embodiment of the present disclosure, even if the time synchronization of each S-UE is different, it is possible to measure an accurate RSTD value, and thus, there may be an effect of increasing the accuracy of SL positioning.

Figure 16:
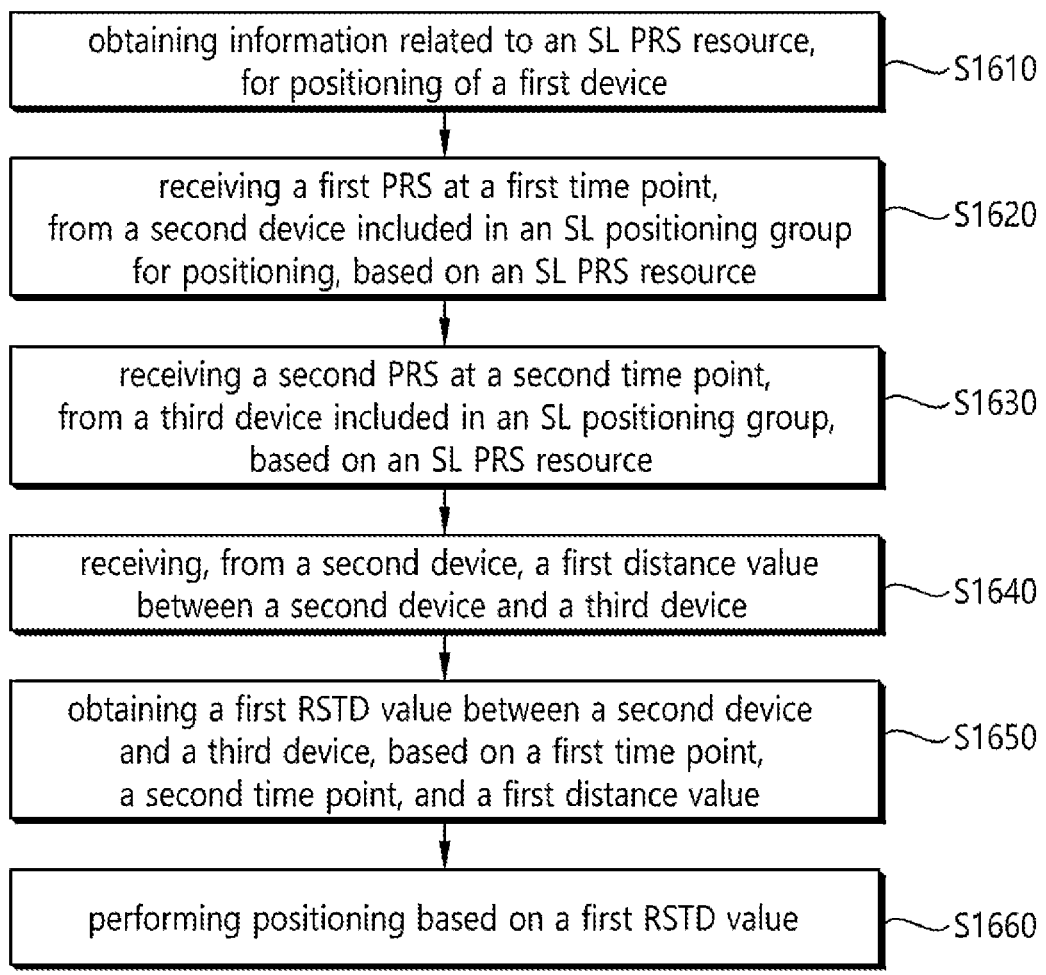
FIG. 16 shows a procedure for performing wireless communication by a first device according to an embodiment of the present disclosure.

FIG. 16 shows a procedure for performing wireless communication by a first device according to an embodiment of the present disclosure. The embodiment of FIG. 16 may be combined with various embodiments of the present disclosure.

Referring to FIG. 16, in step S1610, a first device may obtain information related to a sidelink (SL) positioning reference signal (PRS) resource, for positioning of the first device. In step 1620, the first device may receive a first PRS at a first time point, from a second device included in an SL positioning group for the positioning, based on the SL PRS resource. In step 1630, the first device may receive a second PRS at a second time point, from a third device included in the SL positioning group, based on the SL PRS resource. In step S1640, the first device may receive, from the second device, a first distance value between the second device and the third device. In step S1650, the first device may obtain a first reference signal time difference (RSTD) value between the second device and the third device, based on the first time point, the second time point, and the first distance value. In step S1660, the first device may perform the positioning based on the first RSTD value. For example, the first PRS may be transmitted by the second device at a third time point, the second PRS may be transmitted by the third device at a fourth time point, which is after a time point at which the first PRS is received by the third device by a first time interval, and the first distance value may be obtained based on the third time point, a fifth time point at which the second PRS is received by the second device, and the first time interval.

For example, the first time interval may be pre-configured.

For example, the first time interval may be shared between the first device, the second device and the third device.

For example, additionally, the first device may receive a third PRS at a sixth time point, from a fourth device included in the SL positioning group, based on the SL PRS resource; receive, from the second device, a second distance value between the second device and the fourth device; obtain a second RSTD value between the second device and the fourth device, based on the first time point, the sixth time point, and the second distance value. For example, the positioning may be performed based on the first RSTD value and the second RSTD value, the third PRS may be transmitted by the fourth device at a seventh time point which is after a time point at which the first PRS is received by the fourth device by a second time interval, and the second distance value may be obtained based on the third time point, an eighth time point at which the third PRS is received by the second device, and the second time interval.

For example, the positioning may be performed based on time difference of arrival (TDOA).

For example, the first RSTD value may be obtained based on an equation. For example, the equation may be: t1=t0+L1/c; t2=t0+L/c+T+L2/c; and RSTD=(t2−t1)−L/c−T=(L2−L1)/c. For example, the t0 may be the third time point, the t1 may be the first time point, the t2 may be the second time point, the L may be the first distance value, the L1 may be distance between the first device and the second device, the L2 may be distance between the first device and the third device, the T may be the first time interval, the RSTD may be the first RSTD value, and the c may be speed of light.

For example, the information related to the SL PRS resource may include an SL PRS resource set ID.

For example, the information related to the SL PRS resource may include information related to whether the SL PRS resource is a periodic resource.

For example, the information related to the SL PRS resource may include information regarding a pathloss reference for SL PRS power control.

For example, the pathloss reference may include SL synchronization signal block (SSB), downlink (DL) PRS, uplink (UL) PRS, physical sidelink control channel (PSCCH) demodulation reference signal (DMRS), physical sidelink shared channel (PSSCH) DMRS, physical sidelink feedback channel (PSFCH), or SL channel state information (CSI) RS.

For example, the information related to the SL PRS resource may include information related to an SL PRS comb.

For example, the information related to the SL PRS resource may include at least one of information regarding an index related to a lowest frequency of the SL PRS resource, information regarding a period of the SL PRS resource, information regarding a time offset related to the SL PRS resource, or information regarding bandwidth related to the SL PRS resource.

For example, the information related to the SL PRS resource may include information related to an SL PRS control channel (CCH).

The above-described embodiment may be applied to various devices described below. First, a processor 102 of a first device 100 may obtain information related to a sidelink (SL) positioning reference signal (PRS) resource, for positioning of the first device 100. And, the processor 102 of the first device 100 may control a transceiver 106 to receive a first PRS at a first time point, from a second device 200 included in an SL positioning group for the positioning, based on the SL PRS resource. And, the processor 102 of the first device 100 may control the transceiver 106 to receive a second PRS at a second time point, from a third device 300 included in the SL positioning group, based on the SL PRS resource. And, the processor 102 of the first device 100 may control the transceiver 106 to receive, from the second device 200, a first distance value between the second device 200 and the third device 300. And, the processor 102 of the first device 100 may obtain a first reference signal time difference (RSTD) value between the second device 200 and the third device 300, based on the first time point, the second time point, and the first distance value. And, the processor 102 of the first device 100 may perform the positioning based on the first RSTD value. For example, the first PRS may be transmitted by the second device 200 at a third time point, the second PRS may be transmitted by the third device 300 at a fourth time point, which is after a time point at which the first PRS is received by the third device 300 by a first time interval, and the first distance value may be obtained based on the third time point, a fifth time point at which the second PRS is received by the second device 200, and the first time interval.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain information related to a sidelink (SL) positioning reference signal (PRS) resource, for positioning of the first device; receive a first PRS at a first time point, from a second device included in an SL positioning group for the positioning, based on the SL PRS resource; receive a second PRS at a second time point, from a third device included in the SL positioning group, based on the SL PRS resource; receive, from the second device, a first distance value between the second device and the third device; obtain a first reference signal time difference (RSTD) value between the second device and the third device, based on the first time point, the second time point, and the first distance value; and perform the positioning based on the first RSTD value, wherein the first PRS may be transmitted by the second device at a third time point, wherein the second PRS may be transmitted by the third device at a fourth time point, which is after a time point at which the first PRS is received by the third device by a first time interval, and wherein the first distance value may be obtained based on the third time point, a fifth time point at which the second PRS is received by the second device, and the first time interval.

For example, the first time interval may be pre-configured.

For example, the first time interval may be shared between the first device, the second device and the third device.

For example, additionally, the first device may receive a third PRS at a sixth time point, from a fourth device included in the SL positioning group, based on the SL PRS resource; receive, from the second device, a second distance value between the second device and the fourth device; obtain a second RSTD value between the second device and the fourth device, based on the first time point, the sixth time point, and the second distance value. For example, the positioning may be performed based on the first RSTD value and the second RSTD value, the third PRS may be transmitted by the fourth device at a seventh time point which is after a time point at which the first PRS is received by the fourth device by a second time interval, and the second distance value may be obtained based on the third time point, an eighth time point at which the third PRS is received by the second device, and the second time interval.

For example, the positioning may be performed based on time difference of arrival (TDOA).

For example, the first RSTD value may be obtained based on an equation. For example, the equation may be: t1=t0+L1/c; t2=t0+L/c+T+L2/c; and RSTD=(t2−t1)−L/c−T=(L2−L1)/c. For example, the t0 may be the third time point, the t1 may be the first time point, the t2 may be the second time point, the L may be the first distance value, the L1 may be distance between the first device and the second device, the L2 may be distance between the first device and the third device, the T may be the first time interval, the RSTD may be the first RSTD value, and the c may be speed of light.

For example, the information related to the SL PRS resource may include an SL PRS resource set ID.

For example, the information related to the SL PRS resource may include information related to whether the SL PRS resource is a periodic resource.

For example, the information related to the SL PRS resource may include information regarding a pathloss reference for SL PRS power control.

For example, the pathloss reference may include SL synchronization signal block (SSB), downlink (DL) PRS, uplink (UL) PRS, physical sidelink control channel (PSCCH) demodulation reference signal (DMRS), physical sidelink shared channel (PSSCH) DMRS, physical sidelink feedback channel (PSFCH), or SL channel state information (CSI) RS.

For example, the information related to the SL PRS resource may include information related to an SL PRS comb.

For example, the information related to the SL PRS resource may include at least one of information regarding an index related to a lowest frequency of the SL PRS resource, information regarding a period of the SL PRS resource, information regarding a time offset related to the SL PRS resource, or information regarding bandwidth related to the SL PRS resource.

For example, the information related to the SL PRS resource may include information related to an SL PRS control channel (CCH).

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain information related to a sidelink (SL) positioning reference signal (PRS) resource, for positioning of the first UE; receive a first PRS at a first time point, from a second UE included in an SL positioning group for the positioning, based on the SL PRS resource; receive a second PRS at a second time point, from a third UE included in the SL positioning group, based on the SL PRS resource; receive, from the second UE, a first distance value between the second UE and the third UE; obtain a first reference signal time difference (RSTD) value between the second UE and the third UE, based on the first time point, the second time point, and the first distance value; and perform the positioning based on the first RSTD value, wherein the first PRS may be transmitted by the second device at a third time point, wherein the second PRS may be transmitted by the third device at a fourth time point, which is after a time point at which the first PRS is received by the third device by a first time interval, and wherein the first distance value may be obtained based on the third time point, a fifth time point at which the second PRS is received by the second device, and the first time interval.

According to an embodiment of the present disclosure, a non-transitory computer-readable storage medium storing instructions may be proposed. The instructions, when executed, may cause a first device to: obtain information related to a sidelink (SL) positioning reference signal (PRS) resource, for positioning of the first device; receive a first PRS at a first time point, from a second device included in an SL positioning group for the positioning, based on the SL PRS resource; receive a second PRS at a second time point, from a third device included in the SL positioning group, based on the SL PRS resource; receive, from the second device, a first distance value between the second device and the third device; obtain a first reference signal time difference (RSTD) value between the second device and the third device, based on the first time point, the second time point, and the first distance value; and perform the positioning based on the first RSTD value, wherein the first PRS may be transmitted by the second device at a third time point, wherein the second PRS may be transmitted by the third device at a fourth time point, which is after a time point at which the first PRS is received by the third device by a first time interval, and wherein the first distance value may be obtained based on the third time point, a fifth time point at which the second PRS is received by the second device, and the first time interval.

Figure 17:
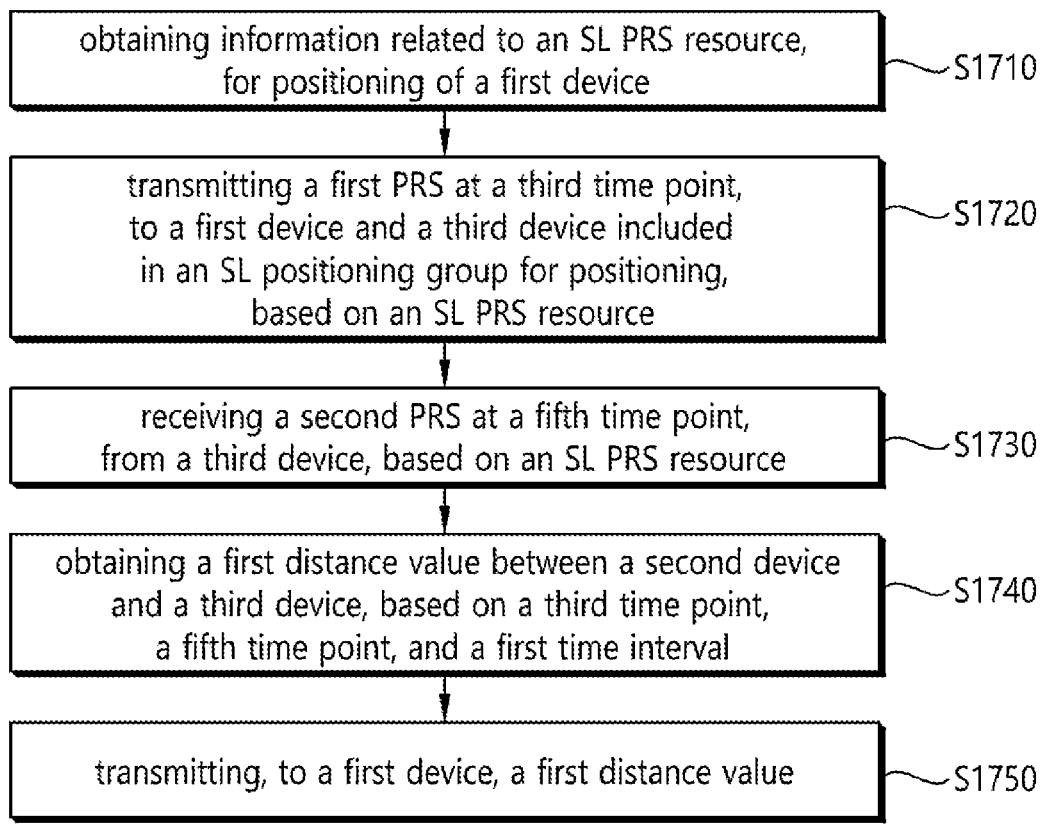
FIG. 17 shows a procedure for a second device to perform wireless communication according to an embodiment of the present disclosure.

FIG. 17 shows a procedure for a second device to perform wireless communication according to an embodiment of the present disclosure. The embodiment of FIG. 17 may be combined with various embodiments of the present disclosure.

Referring to FIG. 17, in step S1710, a second device may obtain information related to a sidelink (SL) positioning reference signal (PRS) resource, for positioning of a first device. In step S1720, the second device may transmit a first PRS at a third time point, to the first device and a third device included in an SL positioning group for the positioning, based on the SL PRS resource. In step S1730, the second device may receive a second PRS at a fifth time point, from the third device, based on the SL PRS resource. In step S1740, the second device may obtain a first distance value between the second device and the third device, based on the third time point, the fifth time point, and a first time interval. In step S1750, the second device may transmit, to the first device, the first distance value. For example, the second PRS may be transmitted by the third device at a fourth time point which is after a time point at which the first PRS is received by the third device by the first time interval, the first PRS may be received by the first device at a first time point, the second PRS may be received by the first device at a second time point, a first reference signal time difference (RSTD) value between the second device and the third device may be obtained by the first device, based on the first time point, the second time point, and the first distance value, and the positioning may be performed based on the first RSTD value.

For example, the first RSTD value may be obtained based on an equation. For example, the equation may be: t1=t0+L1/c; t2=t0+L/c+T+L2/c; and RSTD=(t2−t1)−L/c−T=(L2−L1)/c. For example, the t0 may be the third time point, the t1 may be the first time point, the t2 may be the second time point, the L may be the first distance value, the L1 may be distance between the first device and the second device, the L2 may be distance between the first device and the third device, the T may be the first time interval, the RSTD may be the first RSTD value, and the c may be speed of light.

The above-described embodiment may be applied to various devices described below. First, a processor 202 of a second device 200 may obtain information related to a sidelink (SL) positioning reference signal (PRS) resource, for positioning of a first device 100. And, the processor 202 of the second device 200 may control a transceiver 206 to transmit a first PRS at a third time point, to the first device 100 and a third device 300 included in an SL positioning group for the positioning, based on the SL PRS resource. And, the processor 202 of the second device 200 may control the transceiver 206 to receive a second PRS at a fifth time point, from the third device 300, based on the SL PRS resource. And, the processor 202 of the second device 200 may obtain a first distance value between the second device 200 and the third device 300, based on the third time point, the fifth time point, and a first time interval. And, the processor 202 of the second device 200 may control the transceiver 206 to transmit, to the first device 100, the first distance value. For example, the second PRS may be transmitted by the third device 300 at a fourth time point which is after a time point at which the first PRS is received by the third device 300 by the first time interval, the first PRS may be received by the first device 100 at a first time point, the second PRS may be received by the first device 100 at a second time point, a first reference signal time difference (RSTD) value between the second device 200 and the third device 300 may be obtained by the first device, based on the first time point, the second time point, and the first distance value, and the positioning may be performed based on the first RSTD value.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain information related to a sidelink (SL) positioning reference signal (PRS) resource, for positioning of a first device; transmit a first PRS at a third time point, to the first device and a third device included in an SL positioning group for the positioning, based on the SL PRS resource; receive a second PRS at a fifth time point, from the third device, based on the SL PRS resource; obtain a first distance value between the second device and the third device, based on the third time point, the fifth time point, and a first time interval; and transmit, to the first device, the first distance value. For example, the second PRS may be transmitted by the third device at a fourth time point which is after a time point at which the first PRS is received by the third device by the first time interval, the first PRS may be received by the first device at a first time point, the second PRS may be received by the first device at a second time point, a first reference signal time difference (RSTD) value between the second device and the third device may be obtained by the first device, based on the first time point, the second time point, and the first distance value, and the positioning may be performed based on the first RSTD value.

For example, the first RSTD value may be obtained based on an equation. For example, the equation may be: t1=t0+L1/c; t2=t0+L/c+T+L2/c; and RSTD=(t2−t1)−L/c−T=(L2−L1)/c. For example, the t0 may be the third time point, the t1 may be the first time point, the t2 may be the second time point, the L may be the first distance value, the L1 may be distance between the first device and the second device, the L2 may be distance between the first device and the third device, the T may be the first time interval, the RS TD may be the first RSTD value, and the c may be speed of light.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., between devices).

Hereinafter, a description will be given in more detail with reference to the drawings. In the following drawings/description, the same reference symbols may denote the same or corresponding hardware blocks, software blocks, or functional blocks unless described otherwise.

Figure 18:
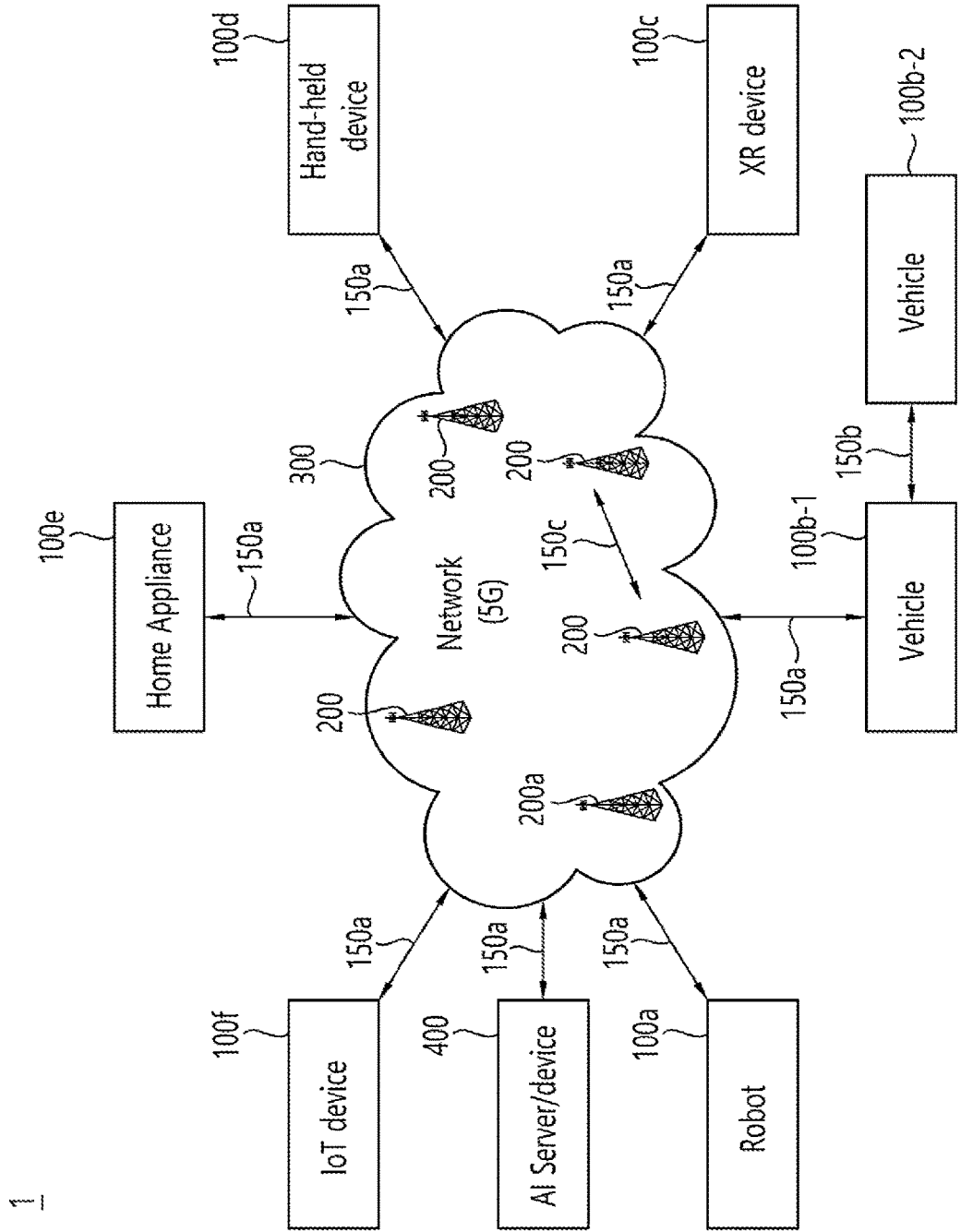
FIG. 18 shows a communication system 1, based on an embodiment of the present disclosure.

FIG. 18 shows a communication system 1, based on an embodiment of the present disclosure. The embodiment of FIG. 18 may be combined with various embodiments of the present disclosure.

Referring to FIG. 18, a communication system 1 to which various embodiments of the present disclosure are applied includes wireless devices, Base Stations (BS s), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BS s/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
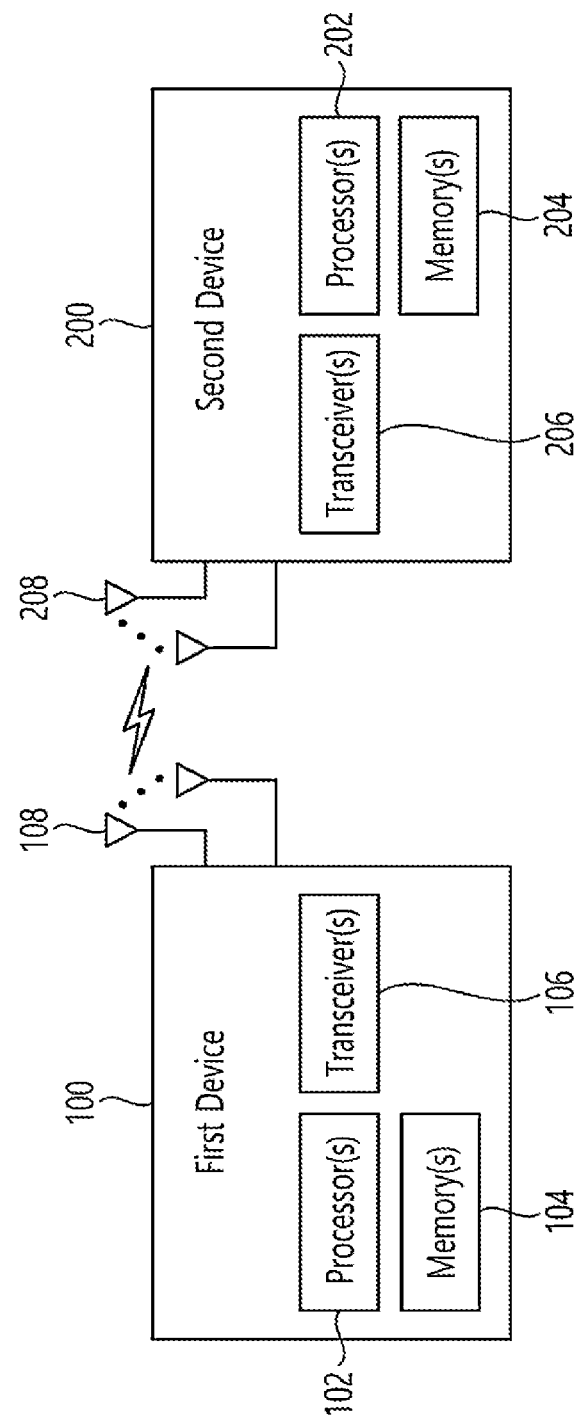
FIG. 19 shows wireless devices, based on an embodiment of the present disclosure.

FIG. 19 shows wireless devices, based on an embodiment of the present disclosure. The embodiment of FIG. 19 may be combined with various embodiments of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
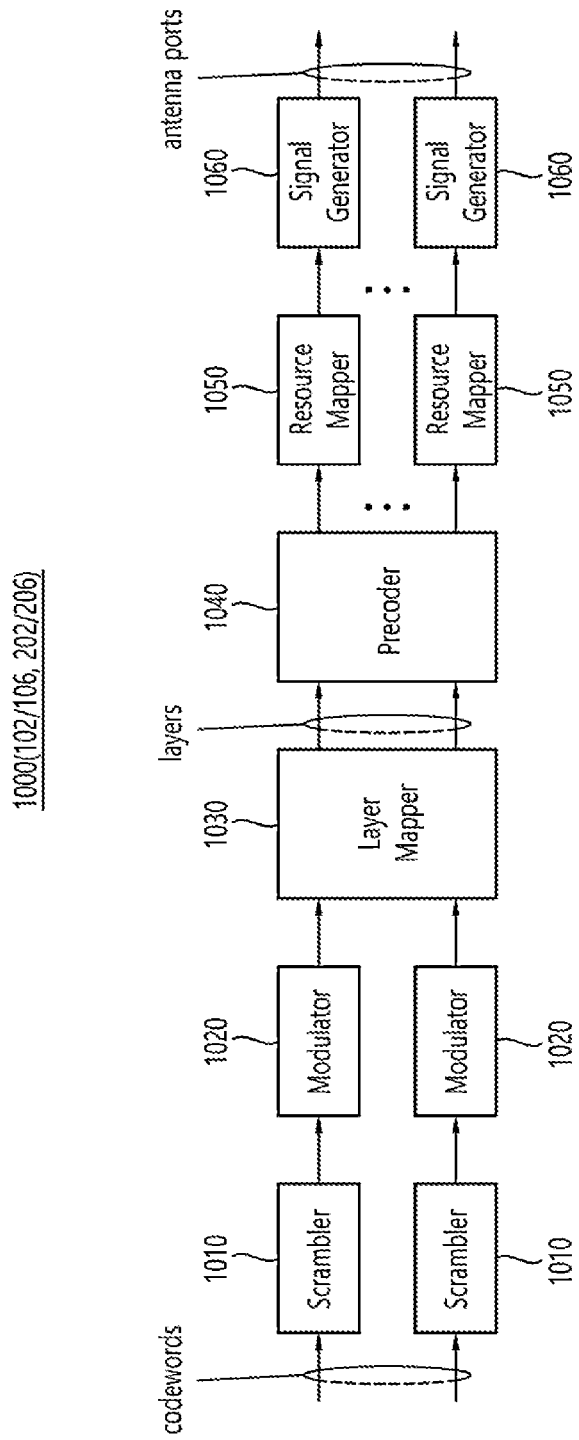
FIG. 20 shows a signal process circuit for a transmission signal, based on an embodiment of the present disclosure.

FIG. 20 shows a signal process circuit for a transmission signal, based on an embodiment of the present disclosure. The embodiment of FIG. 20 may be combined with various embodiments of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
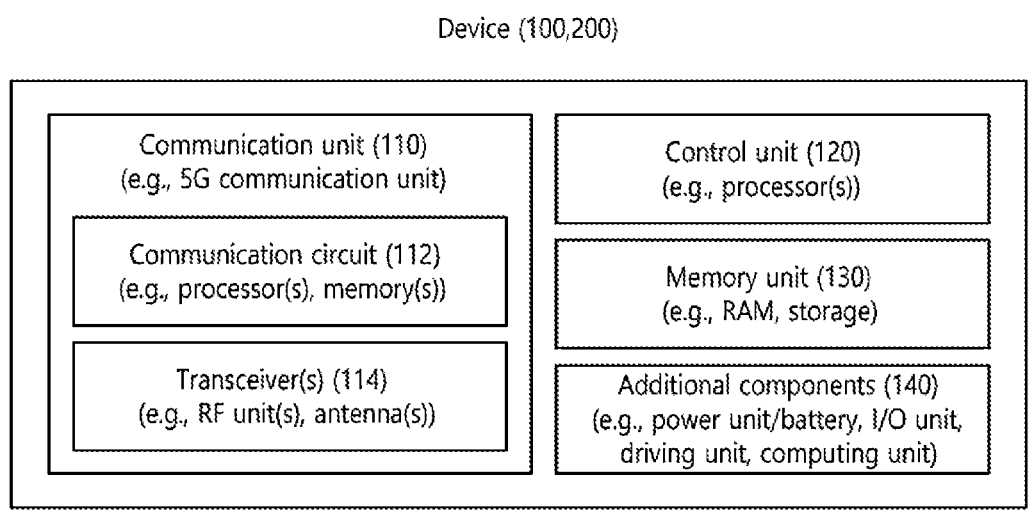
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18). The embodiment of FIG. 21 may be combined with various embodiments of the present disclosure.

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BS s (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
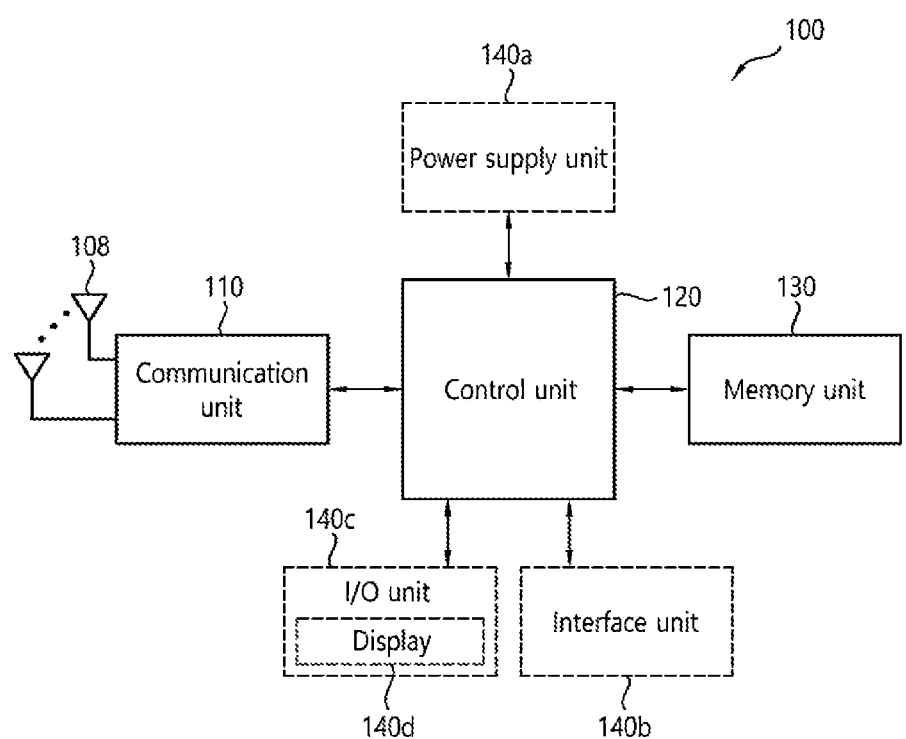
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 22 may be combined with various embodiments of the present disclosure.

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BS s. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
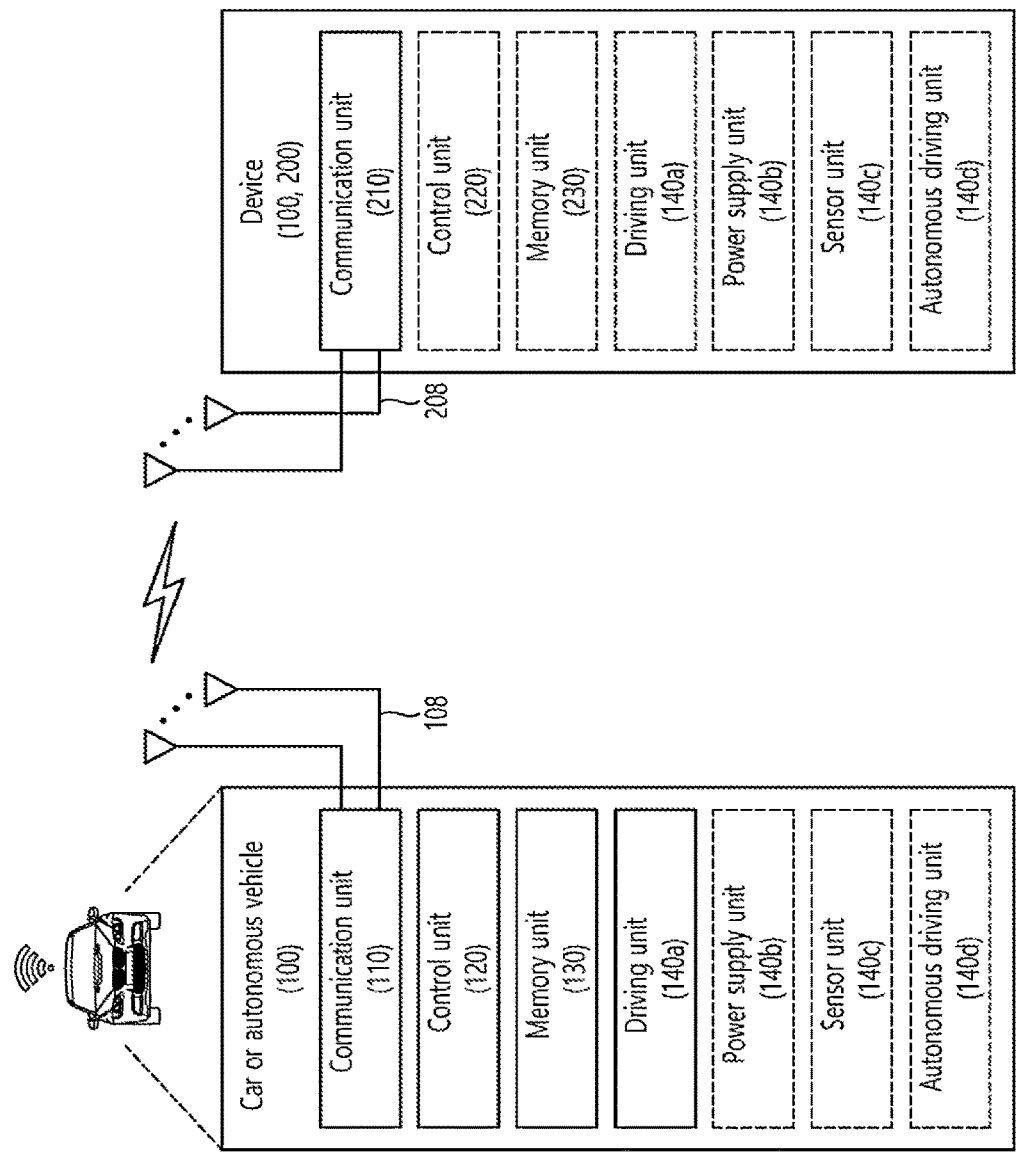
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 23 may be combined with various embodiments of the present disclosure.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNB s and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    obtaining information related to a sidelink (SL) positioning reference signal (PRS) resource, for positioning of the first device;
    receiving a first PRS at a first time point, from a second device included in an SL positioning group for the positioning, based on the SL PRS resource;
    receiving a second PRS at a second time point, from a third device included in the SL positioning group, based on the SL PRS resource;
    receiving, from the second device, a first distance value between the second device and the third device;
    obtaining a first reference signal time difference (RSTD) value between the second device and the third device, based on the first time point, the second time point, and the first distance value; and
    performing the positioning based on the first RSTD value, wherein the first PRS is transmitted by the second device at a third time point,
    wherein the second PRS is transmitted by the third device at a fourth time point, which is after a time point at which the first PRS is received by the third device by a first time interval, and
    wherein the first distance value is obtained based on the third time point, a fifth time point at which the second PRS is received by the second device, and the first time interval,
    wherein the first RSTD value is obtained based on an equation, wherein the equation is:

$t1 = t0 + L1/c;$ $t2 = t0 + L/c + T + L2/c;$ and $RSTD = (t2 - t1) - L/c - T = (L2 - L1)/c,$ wherein the t0 is the third time point,
    wherein the t1 is the first time point,
    wherein the t2 is the second time point,
    wherein the L is the first distance value,
    wherein the L1 is distance between the first device and the second device,
    wherein the L2 is distance between the first device and the third device,
    wherein the T is the first time interval,
    wherein the RSTD is the first RSTD value, and
    wherein the c is speed of light.

2. The method of claim 1, wherein the first time interval is pre-configured.

3. The method of claim 1, wherein the first time interval is shared between the first device, the second device and the third device.

4. The method of claim 1, further comprising:
    receiving a third PRS at a sixth time point, from a fourth device included in the SL positioning group, based on the SL PRS resource;
    receiving, from the second device, a second distance value between the second device and the fourth device;
    obtaining a second RSTD value between the second device and the fourth device, based on the first time point, the sixth time point, and the second distance value,
    wherein the positioning is performed based on the first RSTD value and the second RSTD value,
    wherein the third PRS is transmitted by the fourth device at a seventh time point which is after a time point at which the first PRS is received by the fourth device by a second time interval, and
    wherein the second distance value is obtained based on the third time point, an eighth time point at which the third PRS is received by the second device, and the second time interval.

5. The method of claim 1, wherein the positioning is performed based on time difference of arrival (TDOA).

6. The method of claim 1, wherein the information related to the SL PRS resource includes an SL PRS resource set ID.

7. The method of claim 1, wherein the information related to the SL PRS resource includes information related to whether the SL PRS resource is a periodic resource.

8. The method of claim 1, wherein the information related to the SL PRS resource includes information regarding a pathloss reference for SL PRS power control.

9. The method of claim 8, wherein the pathloss reference includes SL synchronization signal block (SSB), downlink (DL) PRS, uplink (UL) PRS, physical sidelink control channel (PSCCH) demodulation reference signal (DMRS), physical sidelink shared channel (PSSCH) DMRS, physical sidelink feedback channel (PSFCH), or SL channel state information (CSI) RS.

10. The method of claim 1, wherein the information related to the SL PRS resource includes information related to an SL PRS comb.

11. The method of claim 1, wherein the information related to the SL PRS resource includes at least one of information regarding an index related to a lowest frequency of the SL PRS resource, information regarding a period of the SL PRS resource, information regarding a time offset related to the SL PRS resource, or information regarding bandwidth related to the SL PRS resource.

12. The method of claim 1, wherein the information related to the SL PRS resource includes information related to an SL PRS control channel (CCH).

13. A first device for performing wireless communication, the first device comprising:
one or more memories storing instructions;
one or more transceivers; and
one or more processors connected to the one or more memories and the one or more transceivers, wherein the one or more processors execute the instructions to:
obtain information related to a sidelink (SL) positioning reference signal (PRS) resource, for positioning of the first device;
receive a first PRS at a first time point, from a second device included in an SL positioning group for the positioning, based on the SL PRS resource;
receive a second PRS at a second time point, from a third device included in the SL positioning group, based on the SL PRS resource;
receive, from the second device, a first distance value between the second device and the third device;
obtain a first reference signal time difference (RSTD) value between the second device and the third device, based on the first time point, the second time point, and the first distance value; and
perform the positioning based on the first RSTD value,
wherein the first PRS is transmitted by the second device at a third time point,
wherein the second PRS is transmitted by the third device at a fourth time point, which is after a time point at which the first PRS is received by the third device by a first time interval, and
wherein the first distance value is obtained based on the third time point, a fifth time point at which the second PRS is received by the second device, and the first time interval,
wherein the first RSTD value is obtained based on an equation,
wherein the equation is:

$t1 = t0 + L1/c;$ $t2 = t0 + L/c + T + L2/c;$ and $RSTD = (t2-t1) - L/c - T = (L2-L1)/c,$ wherein the t0 is the third time point,
wherein the t1 is the first time point,
wherein the t2 is the second time point,
wherein the L is the first distance value,
wherein the L1 is distance between the first device and the second device,
wherein the L2 is distance between the first device and the third device,
wherein the T is the first time interval,
wherein the RSTD is the first RSTD value, and
wherein the c is speed of light.

14. A device adapted to control a first user equipment (UE), the device comprising:
one or more processors; and
one or more memories operably connectable to the one or more processors and storing instructions, wherein the one or more processors execute the instructions to:
obtain information related to a sidelink (SL) positioning reference signal (PRS) resource, for positioning of the first UE;
receive a first PRS at a first time point, from a second UE included in an SL positioning group for the positioning, based on the SL PRS resource;
receive a second PRS at a second time point, from a third UE included in the SL positioning group, based on the SL PRS resource;
receive, from the second UE, a first distance value between the second UE and the third UE;
obtain a first reference signal time difference (RSTD) value between the second UE and the third UE, based on the first time point, the second time point, and the first distance value; and
perform the positioning based on the first RSTD value,
wherein the first PRS is transmitted by the second UE at a third time point,
wherein the second PRS is transmitted by the third UE at a fourth time point, which is after a time point at which the first PRS is received by the third UE by a first time interval, and
wherein the first distance value is obtained based on the third time point, a fifth time point at which the second PRS is received by the second UE, and the first time interval,
wherein the first RSTD value is obtained based on an equation,
wherein the equation is:

$t1 = t0 + L1/c;$ $t2 = t0 + L/c + T + L2/c;$ and $RSTD = (t2-t1) - L/c - T = (L2-L1)/c,$ wherein the to is the third time point,
wherein the t1 is the first time point,
wherein the t2 is the second time point,
wherein the L is the first distance value,
wherein the L1 is distance between the first device and the second device,
wherein the L2 is distance between the first device and the third device,
wherein the T is the first time interval,
wherein the RSTD is the first RSTD value, and
wherein the c is speed of light.

* * * * *